US009868800B2

(12) United States Patent
Fujino et al.

(10) Patent No.: US 9,868,800 B2
(45) Date of Patent: Jan. 16, 2018

(54) METHOD FOR PRODUCING POLYACRYLIC ACID (SALT)-BASED WATER-ABSORBENT RESIN

(71) Applicant: NIPPON SHOKUBAI CO., LTD., Osaka-shi, Osaka (JP)

(72) Inventors: Shinichi Fujino, Himeji (JP); Kunihiko Ishizaki, Himeji (JP); Satoshi Matsumoto, Himeji (JP)

(73) Assignee: NIPPON SHOKUBAI CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 15/305,971

(22) PCT Filed: Apr. 24, 2015

(86) PCT No.: PCT/JP2015/062483
§ 371 (c)(1),
(2) Date: Oct. 21, 2016

(87) PCT Pub. No.: WO2015/163438
PCT Pub. Date: Oct. 29, 2015

(65) Prior Publication Data
US 2017/0044281 A1 Feb. 16, 2017

(30) Foreign Application Priority Data
Apr. 25, 2014 (JP) ................. 2014-091163

(51) Int. Cl.
*C08F 120/06* (2006.01)
*C08F 20/06* (2006.01)
*C08F 2/01* (2006.01)
*C08F 2/10* (2006.01)
*B01J 20/26* (2006.01)
*B01J 20/30* (2006.01)

(52) U.S. Cl.
CPC ........... *C08F 120/06* (2013.01); *B01J 20/261* (2013.01); *B01J 20/265* (2013.01); *B01J 20/267* (2013.01); *B01J 20/3014* (2013.01); *C08F 2/01* (2013.01); *C08F 2/10* (2013.01); *C08F 20/06* (2013.01)

(58) Field of Classification Search
CPC .......... C08F 120/06; C08F 20/06; C08F 2/01; C08F 2/10; B01J 20/261
USPC ..................................... 526/317.1
See application file for complete search history.

(56) References Cited

U.S. PATENT DOCUMENTS

| 4,769,427 | A | 9/1988 | Nowakowsky et al. |
| 4,873,299 | A | 10/1989 | Nowakowsky et al. |
| 5,145,906 | A | 9/1992 | Chambers et al. |
| 6,174,978 | B1 | 1/2001 | Hatsuda et al. |
| 6,710,141 | B1 | 3/2004 | Heide et al. |
| 8,765,906 | B2 * | 7/2014 | Watanabe ............... C08F 6/008 525/329.7 |
| 2002/0040095 | A1 | 4/2002 | Dairoku et al. |
| 2004/0110897 | A1 | 6/2004 | Sakamoto et al. |
| 2005/0051925 | A1 | 3/2005 | Gartner et al. |
| 2005/0215734 | A1 | 9/2005 | Dairoku et al. |
| 2008/0004408 | A1 | 1/2008 | Stueven et al. |
| 2008/0221282 | A1 | 9/2008 | Weismantel et al. |
| 2008/0275195 | A1 | 11/2008 | Weismantel et al. |
| 2009/0008220 | A1 | 1/2009 | Hillebrecht et al. |
| 2011/0003926 | A1 | 1/2011 | Nogi et al. |
| 2011/0006140 | A1 | 1/2011 | Ishizaki et al. |
| 2011/0009590 | A1 | 1/2011 | Matsumoto et al. |
| 2011/0011491 | A1 | 1/2011 | Matsumoto et al. |
| 2011/0015351 | A1 | 1/2011 | Nogi et al. |
| 2011/0040044 | A1 | 2/2011 | Motoyama et al. |
| 2011/0059329 | A1 | 3/2011 | Dobrawa et al. |
| 2011/0166300 | A1 | 7/2011 | Dairoku et al. |
| 2011/0237754 | A1 | 9/2011 | Daniel et al. |
| 2011/0319518 | A1 | 12/2011 | Kadonaga et al. |
| 2012/0157625 | A1 | 6/2012 | Kitano et al. |
| 2012/0157635 | A1 | 6/2012 | Nogi et al. |
| 2012/0157650 | A1 | 6/2012 | Nogi et al. |
| 2012/0172536 | A1 | 7/2012 | Nogi et al. |
| 2013/0102750 | A1 | 4/2013 | Watanabe et al. |
| 2013/0281594 | A1 | 10/2013 | Dobrawa et al. |

(Continued)

FOREIGN PATENT DOCUMENTS

CN 102007170 A 4/2011
EP 0409136 A2 1/1991
(Continued)

OTHER PUBLICATIONS

Graham A. et al. (1998) "Commercial Processes for the Manufacture of Superabsorbent Polymers" Modern Superabsorbent Polymer Technology, 69-103.
International Search Report dated Jul. 28, 2015 Issued in International Patent Application No. PCT/JP2015/062483.
International Preliminary Report on Patentability dated Nov. 3, 2016 Issued in International Patent Application No. PCT/JP2015/062483.
(Continued)

*Primary Examiner* — Michael M Bernshteyn
(74) *Attorney, Agent, or Firm* — Harness, Dickey and Pierce, P.L.C.

(57) ABSTRACT

A method for producing polyacrylic acid (salt)-based water-absorbing resin includes a step of polymerizing an acrylic acid (salt)-based aqueous monomer solution, the polymerization step involving use of a polymerization reaction apparatus including a polymerization reaction unit covered with a casing, the polymerization step involving a polymerization reaction under internal pressure of the polymerization reaction unit, the internal pressure being slightly reduced and having a pressure reduction level of more than 0 kPa and not more than 10 kPa relative to the ambient pressure at the periphery of the polymerization reaction unit.

17 Claims, No Drawings

(56) References Cited

U.S. PATENT DOCUMENTS

| | | | |
|---|---|---|---|
| 2014/0371400 A1* | 12/2014 | Tachi | A61L 15/24 525/384 |
| 2016/0332140 A1 | 11/2016 | Bauer et al. | |
| 2017/0216816 A1 | 8/2017 | Matsumoto et al. | |

FOREIGN PATENT DOCUMENTS

| | | |
|---|---|---|
| JP | 62-100507 | 5/1987 |
| JP | 62-227904 | 10/1987 |
| JP | 63-178115 | 7/1988 |
| JP | 1-178509 | 7/1989 |
| JP | 03-56513 | 3/1991 |
| JP | 03-64301 | 3/1991 |
| JP | 3-143903 | 6/1991 |
| JP | 3-174414 | 7/1991 |
| JP | 5-247225 | 9/1993 |
| JP | 5-310806 | 11/1993 |
| JP | 11-228604 A | 8/1999 |
| JP | 2000-336115 A | 12/2000 |
| JP | 2002-212204 A | 7/2002 |
| JP | 2003-514961 | 4/2003 |
| JP | 2003-261601 A | 9/2003 |
| JP | 2005-502745 | 1/2005 |
| JP | 2005-307195 | 11/2005 |
| JP | 2006-160845 | 6/2006 |
| JP | 2006-160866 | 6/2006 |
| JP | 2008-537555 | 9/2008 |
| JP | 2013-503927 A | 2/2013 |
| JP | 2013-522431 A | 6/2013 |
| JP | 2017-509737 A | 4/2017 |
| WO | WO-2007/028749 A1 | 3/2007 |
| WO | WO-2007/028750 A1 | 3/2007 |
| WO | WO-2009-113679 A1 | 9/2009 |
| WO | WO-2011-024975 A1 | 3/2011 |
| WO | WO-2011-136301 A1 | 11/2011 |
| WO | WO-2013-073682 A1 | 5/2013 |
| WO | WO-2013/186176 A1 | 12/2013 |
| WO | WO-2015/110321 A1 | 7/2015 |
| WO | WO-2015/133498 A1 | 9/2015 |

OTHER PUBLICATIONS

Office Action issued in Chinese Patent Application No. CN201580022031.X, dated Oct. 24, 2017 with English translation.

Extended European Search Report dated Nov. 21, 2017 issued in European Patent Application No. 15782266.9.

Office Action dated Nov. 28, 2017 issued in Japanese Patent Application No. 2016-515216.

* cited by examiner

US 9,868,800 B2

METHOD FOR PRODUCING POLYACRYLIC ACID (SALT)-BASED WATER-ABSORBENT RESIN

PRIORITY STATEMENT

This patent application is a U.S. national stage filing under 35 U.S.C. §371 of International Application No. PCT/JP2015/062483 filed on 24 Apr. 2015, which claims priority to Japanese Patent Application No. 2014-091163 filed on 25 Apr. 2014. The entire disclosures of each of the above recited applications are incorporated herein by reference.

TECHNICAL FIELD

The present invention relates to a method for producing a polyacrylic acid (salt)-based water-absorbing resin. The present invention relates more particularly to a method for producing, with high productivity, a water-absorbing resin having stable physical properties.

BACKGROUND ART

Water-absorbing resin (super absorbent polymer or SAP) is a water-swellable, water-insoluble polymer gelling agent. Water-absorbing resin is widely used typically in the form of powder having a particle diameter of 1 mm or less for absorbent applications including a hygiene product such as a disposable diaper and a sanitary napkin, an agricultural and horticultural water retaining agent, an industrial waterproofing agent and the like.

Water-absorbing resin is produced from many different monomers and hydrophilic polymers as raw materials. Among others, polyacrylic acid (salt)-based water-absorbing resin, which contains an acrylic acid and/or a salt thereof as a monomer, has high water absorption performance and is thus industrially produced in the largest amount.

Water-absorbing resin is produced as product in the form of particulates through various steps including polymerization, drying, crushing, classifying, surface crosslinking and the like (Non Patent Literature 1). As for said polymerization, the following have been proposed: aqueous solution polymerization, reversed phase suspension polymerization, spray polymerization, droplet polymerization and the like. In particular, the aqueous solution polymerization, which involves no use of dispersion medium, is excellent in terms of the physical properties of the obtained water-absorbing resin and its productivity.

As for aqueous solution polymerization, the following techniques have been proposed: a polymerization technique under adiabatic conditions (see Patent Literature 1), a polymerization technique while removing heat through heat transfer and water evaporation at a surface in contact of a polymerization belt and a hydrogel (see Patent Literature 2), a polymerization technique while removing heat through heat transfer and water evaporation at a surface in contact of an inner wall of a polymerization device and a hydrogel (see Patent Literatures 3 and 4), a polymerization technique while foaming or expansion of a hydrogel (see Patent Literatures 5 to 7), a polymerization technique while removing heat with a belt of a continuous belt polymerization device (see Patent Literature 8), and a polymerization technique while controlling a gas phase temperature (see Patent Literatures 9 and 10). Also proposed are: a polymerization technique under reduced pressure (see Patent Literatures 11 to 13) and a polymerization technique under increased pressure (see Patent Literatures 14 to 18). Further, a polymerization technique of collecting and recycling water and/or a monomer component volatilized during polymerization (see Patent Literatures 2 and 5 to 7).

CITATION LIST

Patent Literature

[Patent Literature 1]
Japanese Patent Application Publication, No. H03-174414 A (Publication Date: Jul. 29, 1991)
[Patent Literature 2]
Japanese Patent Application Publication, No. H11-228604 A (Publication Date: Aug. 24, 1999)
[Patent Literature 3]
Japanese Patent Application Publication, No. 2003-514961 (Publication Date: Apr. 22, 2003)
[Patent Literature 4]
Japanese Patent Application Publication, No. 2005-502745 (Publication Date: Jan. 27, 2005)
[Patent Literature 5]
Japanese Patent Application Publication, No. 2002-212204 A (Publication Date: Jul. 31, 2002)
[Patent Literature 6]
Japanese Patent Application Publication, No. 2003-261601 A (Publication Date: Sep. 19, 2003)
[Patent Literature 7]
Japanese Patent Application Publication, No. 2005-307195 A (Publication Date: Nov. 4, 2005)
[Patent Literature 8]
Japanese Patent Application Publication, No. 2006-160845 A (Publication Date: Jun. 22, 2006)
[Patent Literature 9]
Japanese Patent Application Publication, No. 2006-160866 A (Publication Date: Jun. 22, 2006)
[Patent Literature 10]
PCT International Patent Publication No. 2013/073682 pamphlet
[Patent Literature 11]
Japanese Patent Application Publication, No. S62-100507 A (Publication Date: May 11, 1987)
[Patent Literature 12]
Japanese Patent Application Publication, No. S62-227904 A (Publication Date: Oct. 6, 1987)
[Patent Literature 13]
Japanese Patent Application Publication, No. 2008-537555 (Publication Date: Sep. 18, 2008)
[Patent Literature 14]
Japanese Patent Application Publication, No. 03-056513 A (Publication Date: Mar. 12, 1991)
[Patent Literature 15]
Japanese Patent Application Publication, No. 03-064301 A (Publication Date: Mar. 19, 1991)
[Patent Literature 16]
PCT International Patent Publication No. 2013/186176 pamphlet
[Patent Literature 17]
PCT International Patent Publication No. 2007/028749 pamphlet
[Patent Literature 18]
PCT International Patent Publication No. 2007/028750 pamphlet Non Patent Literature

[Non Patent Literature 1]
Modern Superabsorbent Polymer Technology (1998), pp. 69 to 103

SUMMARY OF INVENTION

Technical Problem

There are issues in the above-mentioned conventional techniques where a polymerization state and physical properties of a water-absorbing resin to be obtained become unstable, and particularly, in a case of: boiling polymerization, in which the maximum reaching temperature during polymerization is higher than 100° C.; high-temperature-starting polymerization, in which polymerization starts at a temperature of not lower than 40° C.; or short-term polymerization, in which polymerization lasts for a time period of not longer than 10 minutes, the polymerization state becomes unstable, causing a polymerization time, a polymerization temperature and physical properties of water-absorbing resin to be produced to largely vary depending on, for instance, certain hours (for example, a time), a certain time period, a day, a season and the like.

Also, there are other issues where, in a case of aqueous solution polymerization, spray polymerization or droplet polymerization, gases discharged from a polymerization device contain a large amount of water or acrylic acid that have been evaporated from an aqueous monomer solution, and collecting and reusing such water and acrylic acid come with great difficulty.

Therefore, an object of the present invention is to provide a method for producing with high productivity water-absorbing resin having stable physical properties by stabilizing polymerization time and polymerization temperature for polymerization of the water-absorbing resin, especially for high-temperature polymerization, and further, for continuous high-temperature polymerization on an industrial scale. Also, it is to provide a method for stably collecting and reusing a material that volatilizes in a polymerization step.

Solution to Problem

The inventors of the present invention conducted diligent research to solve the above problems, and as a result they discovered that the above-mentioned polymerization state is influenced by a gas entering (introduced into) a polymerization device from outside a polymerization reaction unit, in particular, the entry (introduction) of air or inert gas having an uncontrolled temperature. The inventors of the present invention have further discovered that the entry (introduction) of such gas changes the temperature of an aqueous monomer solution during a polymerization reaction and that this change leads to varied physical properties for water-absorbing resin to be produced.

The inventors of the present invention then discovered to solve the above problem by a measure of slightly reducing the pressure inside the polymerization reaction unit, which measure is not disclosed in any document of a conventional technique including Patent Literatures 1 to 18 and Non Patent Literature 1 above. The inventors of the present invention have consequently completed the present invention.

Specifically, a method in accordance with the present invention for producing polyacrylic acid (salt)-based water-absorbing resin (first invention) is a method for producing polyacrylic acid (salt)-based water-absorbing resin, the method including a step of polymerizing an acrylic acid (salt)-based aqueous monomer solution, in which: a polymerization reaction apparatus used in said polymerization step has a polymerization reaction unit covered with a casing; and in said polymerization step, a polymerization reaction is carried out under conditions that internal pressure of the polymerization reaction unit is reduced by a range of more than 0 kPa and not more than 10 kPa relative to ambient pressure at the periphery of the polymerization reaction unit.

A polymerization reaction apparatus of the present invention (second invention) is a polymerization reaction apparatus for polyacrylic acid (salt)-based water-absorbing resin, the polymerization reaction apparatus including: a polymerization reaction unit provided with a discharge outlet and covered with a casing; discharge piping connected to the discharge outlet; and a manometer to measure a difference in pressure between internal pressure of the polymerization reaction unit and ambient pressure at the periphery of the polymerization reaction unit.

A collecting method of the present invention (third invention) is a method for collecting a volatile component discharged from a step of polymerizing an acrylic acid (salt)-based aqueous monomer solution, in which the volatile component discharged from the polymerization step is collected under conditions that internal pressure of a polymerization reaction unit, in which the polymerization step is carried out, is reduced by a range of more than 0 kPa and not more than 10 kPa relative to ambient pressure at the periphery of the polymerization reaction unit.

Advantageous Effects of Invention

A method of the present invention enables to produce water-absorbing resin having stable physical properties with high productivity regardless of a change in the ambient temperature. Further, a method of the present invention enables to stably collect a volatile component that contains water or acrylic acid and that volatilizes during a polymerization step and is discharged and further to reuse the volatile component.

DESCRIPTION OF EMBODIMENTS

The following descriptions describe the present invention in detail. The present invention is, however, not limited in scope to the descriptions, and may be altered from the examples below and practiced as appropriate, provided that such alteration is not a departure from the scope of the present invention. Specifically, the present invention shall not be construed as being limited to the embodiments below, and may be modified in many ways within the scope of the claims. Any embodiment based on a proper combination of technical means disclosed in different embodiments is also encompassed in the technical scope of the present invention.

[1] Definitions of Terms (1-1) "Water-Absorbing Resin"

The term "water-absorbing resin" as used in the present invention means a water-swellable and water-insoluble polymer gelatinizer that satisfies the following physical properties. Specifically, the term "water-absorbing resin" as used in the present invention means a polymer gelling agent that satisfies CRC (centrifuge retention capacity) defined as "water-swellable" in ERT 442.2-02 and having not less than 5 g/g and Ext (water soluble component) defined as "water-insoluble" in ERT 470.2-02 and having not more than 50 weight %.

The water-absorbing resin can be designed according to its purpose of use and its object, and is not limited to a particular water-absorbing resin. The water-absorbing resin is preferably a hydrophilic crosslinked polymer which has been obtained by crosslinking and polymerizing unsaturated monomers each of which has a carboxyl group. Moreover, the water-absorbing resin does not need to be in a form in which the water-absorbing resin is wholly a crosslinked polymer, and can be a water-absorbing resin composition that contains, for example, an additive to the extent that the physical properties (CRC and Ext) mentioned above are satisfied.

Further, the "water-absorbing resin" of the present invention may refer to not only a pre-shipment end product but also an intermediate produced during a process for producing the water-absorbing resin (e.g., a crosslinked hydrogel polymer after polymerization, a dry polymer after drying, a water-absorbing resin powder before surface crosslinking, or the like), and all of these are collectively referred to as the "water-absorbing resin". Water-absorbing resin may have any form such as a sheet form, a fiber form, a film form, a particulate form, or a gel form. The water-absorbing resin of the present invention is preferably in a particulate form.

(1-2) "Polyacrylic Acid (Salt)"

The term "polyacrylic acid (salt)" as used in the present invention refers to polyacrylic acid and/or a salt thereof, and means a polymer that contains, as a main component, a repeating unit of acrylic acid and/or a salt thereof (hereinafter referred to as "acrylic acid (salt)") and that contains a graft component as an optional component.

The term "main component" means that the acrylic acid (salt) is used (contained) in an amount normally of 50 mol % to 100 mol %, preferably of 70 mol % to 100 mol %, more preferably of 90 mol % to 100 mol %, and even more preferably of substantially 100 mol %, per a total amount of monomers for use in polymerization (excluding an internal crosslinking agent).

In a case where the polyacrylic acid salt is a crosslinked polymer, the polyacrylic acid salt contains a water-soluble salt, preferably a monovalent salt, more preferably an alkali metal salt or ammonium salt, still more preferably an alkali metal salt, and particularly preferably a sodium salt.

(1-3) "EDANA" and "ERT"

The term "EDANA" is an acronym for European Disposables and Nonwovens Associations. The term "ERT" is an acronym for EDANA Recommended Test Methods, which is an European standard (de facto international standard) method for measuring a water-absorbing resin. In the present invention, physical properties of a water-absorbing resin are measured in conformity with the ERT master copy (revised in 2002; publicly known literature) unless otherwise specified.

(a) "CRC" (Centrifuge Retention Capacity) (ERT 441.2-02)

The term "CRC" is an acronym for "Centrifuge Retention Capacity" and refers to a fluid retention capacity without pressure (hereinafter also referred to as a "fluid retention capacity") of a water-absorbing resin.

Specifically, the CRC refers to a fluid retention capacity (unit; g/g) measured after 0.2 g of a water-absorbing resin contained in a nonwoven fabric bag is immersed in a large excess of 0.9 weight % of aqueous sodium chloride solution for 30 minutes so as to be allowed to freely swell, and then the water-absorbing resin is drained in a centrifuge (250 G).

(b) "AAP" (Fluid Retention Capacity Under Pressure) (ERT 442.2-02)

The term "AAP" is an acronym for "Absorption Against Pressure" and refers to a fluid retention capacity under pressure of a water-absorbing resin.

Specifically, the AAP refers to a fluid retention capacity (unit; g/g) measured after 0.9 g of a water-absorbing resin is allowed to swell in a large excess of 0.9 weight % of aqueous sodium chloride solution for one hour under a load of 2.06 kPa (equivalent to 21 $g/cm^2$, 0.3 psi). Alternatively, the AAP may be measured by replacing the above load with a load of 4.83 kPa (equivalent to 49 $g/cm^2$, 0.7 psi).

ERT 442.2-02 uses the term "Absorption Under Pressure", which refers to substantially the same thing as "AAP".

(c) "Ext" (Water Soluble Component) (ERT 470.2-02)

The term "Ext" is an abbreviation for "Extractables" and refers to a water soluble component (water soluble component amount) of a water-absorbing resin.

Specifically, the Ext refers to a dissolved polymer amount (unit; weight %) obtained by adding 1.0 g of a water-absorbing resin to 200 ml of 0.9 weight % of aqueous sodium chloride solution and stirring a resultant mixture at 500 rpm for 16 hours. Note that the dissolved polymer amount is measured by pH titration.

(d) "PSD" (Particle Size Distribution) (ERT 420.2-02)

The term "PSD" is an acronym for "Particle Size Distribution" and refers to a particle size distribution of a water-absorbing resin which particle size distribution is measured by sieve classification.

Note that a weight average particle diameter (D50) and a logarithmic standard deviation ($\sigma\zeta$) of a particle size distribution are measured according to a method similar to "(3) Mass-Average Particle Diameter (D50) and Logarithmic Standard Deviation ($\sigma\zeta$) of Particle Diameter Distribution", which is a method disclosed in U.S. Pat. No. 7,638,570.

In a case of a crosslinked hydrogel polymer in a particulate form, the particle diameter is measured in conformity with a method disclosed in Japanese Patent Application Publication, No. 2000-063527 A.

(e) "Moisture Content" (ERT 430.2-02)

The term "Moisture Content" (ERT 430.2-02) refers to a moisture content of a water-absorbing resin.

Specifically, the moisture content is a value (unit; weight %) calculated from an amount lost from drying 1 g of a water-absorbing resin at 105° C. for 3 hours. The moisture content may be measured at a drying temperature changed to 180° C.

(1-4) "Liquid Permeability"

The term "Liquid permeability" as used in the present invention refers to flowability a liquid passing through a space between respective particles of a swollen gel under load or without load. The "liquid permeability" is measured typically as a Saline Flow Conductivity (SFC) or Gel Bed Permeability (GBP).

The term "SFC" refers to liquid permeability of 0.69 weight % of aqueous sodium chloride solution per 1.5 g of a water-absorbing resin under a load of 0.3 psi (2.06 kPa), and is measured according to the SFC test method disclosed in the specification of U.S. Pat. No. 5,669,894.

The term "GBP" refers to liquid permeability of 0.9 weight % of aqueous sodium chloride solution per a water-absorbing resin which is under load (0.3 psi) or is allowed to freely swell, and is measured according to the GBP test method disclosed in International Publication No. WO 2005/016393.

(1-5) Others

In this specification, a range "X to Y" refers to "not less than X and not more than Y". Moreover, unless otherwise specified, "t (ton)", which is a unit of weight, refers to "metric ton", and "ppm" refers to "ppm by weight" or "ppm by mass". The terms "weight" and "mass" are synonymous with each other. The terms "parts by weight" and "parts by mass" are synonymous with each other. The terms "weight %" and "mass %" are synonymous with each other. Further, " . . . acid (salt)" refers to " . . . acid and/or salt thereof", and "(meth)acrylic" means "acrylic and/or methacrylic".

[2] Method for Producing Polyacrylic Acid (Salt)-Based Water-Absorbing Resin

The following description will discuss a method (namely, steps (2-1) to (2-9)) of the present invention for producing polyacrylic acid (salt)-based water-absorbing resin.

(2-1) Step of Preparing an Aqueous Monomer Solution

This step is a step of preparing an aqueous solution (hereinafter referred to as "aqueous monomer solution") containing an acrylic acid (salt)-based monomer as a main component. The term "aqueous monomer solution" refers to a liquid that contains all additives including monomers and a polymerization initiator (all raw materials) and that is immediately before being subjected to polymerization, that is, a liquid that is immediately before the start of polymerization in feeding piping connected to a polymerization reaction apparatus or in a polymerization reaction apparatus. The term "as a main component" means that the acrylic acid (salt)-based monomer is contained (used) in an amount normally of not less than 50 mol %, preferably of not less than 70 mol %, more preferably of not less than 90 mol % (an upper limit is 100 mol %), per a total amount of monomers (excluding an internal crosslinking agent) to be subjected to a polymerization reaction for a water-absorbing resin. The aqueous monomer solution may contain a monomer slurry liquid as long as a water-absorbing resin to be produced will not have degraded physical properties. For convenience of description, however, this section describes an aqueous monomer solution. The aqueous monomer solution contains, for example, an internal crosslinking agent and/or polymerization initiator below.

(Acrylic Acid (Salt)-Based Monomer)

The acrylic acid (salt)-based monomer for use in the present invention is not limited to any particular one, and may be a water-soluble unsaturated monomer disclosed in International Publication No. 2013/073682, for example. The acrylic acid (salt)-based monomer is, among others, preferably a monomer containing acrylic acid (salt) from the viewpoint of physical properties of a water-absorbing resin to be produced as well as productivity.

The acrylic acid may be a publicly known acrylic acid containing a trace component(s) such as a polymerization inhibitor and/or an impurity. The polymerization inhibitor is not limited to any particular one, and is preferably a methoxyphenol, more preferably p-methoxyphenol. The polymerization inhibitor is contained (used) in an amount preferably of not more than 200 ppm, more preferably of 10 ppm to 130 ppm, further preferably of 20 ppm to 100 ppm, from the viewpoint of, for example, polymerizability of the acrylic acid and the color of a water-absorbing resin to be produced. The impurity in the acrylic acid for the present invention may be a compound disclosed in U.S. Patent Application No. 2008/0161512.

The acrylic acid salt may be prepared by neutralizing the acrylic acid with, for example, an alkali metal hydroxide such as sodium hydroxide, lithium hydroxide, or potassium hydroxide, an alkali metal carbonate or hydrogencarbonate, ammonia, or an organic amine. The acrylic acid salt is, among others, preferably sodium acrylate from the viewpoint of the cost. Further, the acrylic acid salt may be a commercially available product or may be prepared by neutralizing the acrylic acid in a plant for producing a water-absorbing resin.

The above neutralization may refer to neutralization of acrylic acid (before polymerization) and/or neutralization of a crosslinked polymer resulting from crosslinking and polymerizing acrylic acid (after polymerization) (hereinafter referred to as "later neutralization"). The neutralization may alternatively refer to neutralization during polymerization.

The neutralization has a rate of neutralization preferably of 40 mol % to 100 mol %, more preferably of 50 mol % to 90 mol %, further preferably of 60 mol % to 80 mol %, with respect to an acid group of the monomer. The neutralization for the present invention is performed under conditions (such as a neutralization device, a neutralization temperature, and a retention time) as disclosed in, for example, International Publication No. 2009/123197 or U.S. Patent Application No. 2008/0194863. The neutralization may be performed by a continuous method or a batch method, but is preferably performed by a continuous method from the viewpoint of production efficiency, for example.

The aqueous monomer solution may contain, in combination with acrylic acid (salt), a monomer other than acrylic acid (salt) as "another monomer", an example of which is a compound disclosed in U.S. Patent Application No. 2005/0215734 (excluding acrylic acid (salt)).

(Internal Crosslinking Agent)

The internal crosslinking agent for use in the present invention is not limited to any particular one, and may be a compound disclosed in International Publication No. 2013/073682, for example. The internal crosslinking agent is one or a combination of two or more selected from the disclosed compounds in view of reactivity. The internal crosslinking agent is, in particular, preferably a compound having two or more polymerizable unsaturated groups. The polymerizable unsaturated groups are each preferably an allyl group or a (meth)acrylate group, more preferably a (meth)acrylate group.

The internal crosslinking agent is used in an amount that may be set as appropriate depending on physical properties desired for a water-absorbing resin to be produced and that is thus not limited to any particular amount. The amount used is, however, preferably 0.0001 mol % to 10 mol %, more preferably 0.001 mol % to 1 mol %, with respect to the monomer component. Using an excessively small amount tends to result in a decreased gel strength and/or an increased water soluble component. Using an excessively large amount, on the other hand, tends to undesirably result in a decreased fluid retention capacity.

The internal crosslinking agent is normally added to the aqueous monomer solution before polymerization, but may alternatively be added to a polymer after polymerization so that the internal crosslinking agent is allowed to infiltrate the polymer or can be kneaded into the polymer. Further alternative methods include a method of adding an internal crosslinking agent during or after polymerization for post-crosslinking, a method of using a radical polymerization initiator for radical crosslinking, and a method of using an active energy ray such as an electron beam or an ultraviolet ray for radiation-induced crosslinking. Further, these methods may be used in combination.

(Polymerization Initiator)

The polymerization initiator for use in the present invention is selected as appropriate in accordance with a polymerization method or the like and is not limited to any particular one. Examples of the polymerization initiator for suitable use in the present invention include a thermal decomposition initiator, a photolytic polymerization initiator, and a redox polymerization initiator that contains a reducing agent for facilitating decomposition of any of those polymerization initiators.

Specifically, the polymerization initiator is one or a combination of two or more selected as appropriate from the polymerization initiators disclosed in U.S. Pat. No. 7,265,190. The present invention likely produces an effect (that is, polymerization stability under slightly reduced pressure) with use of a thermal decomposition initiator. Further, the polymerization initiator is preferably a peroxide or an azo compound, more preferably a peroxide, further preferably a persulfate, from the viewpoint of, for example, the cost and reduction of a residual monomer.

The polymerization initiator may be used in any amount, and is used in an amount preferably of 0.001 weight % to 2 weight %, more preferably of 0.01 weight % to 0.5 weight %, with respect to the monomer component.

(Other Materials Added to Aqueous Monomer Solution)

The present invention may include adding any material below to the aqueous monomer solution during the preparation thereof and/or during polymerization from the viewpoint of improved physical properties for a water-absorbing resin to be produced.

Specifically, the present invention may include adding a hydrophilic polymer such as starch, a starch derivative, cellulose, a cellulose derivative, polyvinyl alcohol, polyacrylic acid (salt), and crosslinked polyacrylic acid (salt), a chain transfer agent such as hypophosphorous acid (salt), or a chelating agent. In a case where any of these compounds is added, it is added in an amount preferably of 0.001 weight % to 30 weight %, more preferably of 0.005 weight % to 20 weight %, with respect to the monomer component. Using a water-soluble resin or water-absorbing resin as the hydrophilic polymer results in production of a graft polymer or a water-absorbing resin composition (for example, a starch-acrylic acid polymer or a PVA-acrylic acid polymer). Such a graft polymer and water-absorbing resin composition are also included in the scope of the present invention.

(Water Content of Aqueous Monomer Solution)

The acrylic acid (salt)-based monomer for the present invention is preferably an aqueous solution. The aqueous monomer solution, if having a low monomer content, does not have sufficient performance, and is thus required to contain the monomer at an appropriate concentration.

Specifically, the aqueous monomer solution has a water content preferably of 30 weight % to 70 weight %, more preferably of 35 weight % to 65 weight %, further preferably of 40 weight % to 60 weight %, from the viewpoint of removal of polymerization heat during the polymerization below, heat transfer and mass transfer during a polymerization reaction, deterioration during a drying step, and the cost.

A water content of less than 30 weight % will result in insufficient removal of polymerization heat and thus make it difficult to control a polymerization reaction. A water content of more than 70 weight % will prevent heat transfer and mass transfer during a polymerization reaction and thus fail to provide a uniform crosslinked polymer. Further, a large quantity of heat will be necessary during a drying step in order to dry the aqueous monomer solution so that the dried polymer prepared through the drying step will have a moisture content preferably of not more than 15 weight %, more preferably of not more than 10 weight %, further preferably of not more than 8 weight %, particularly preferably of not more than 5 weight %. A water content of more than 70 weight % is thus not preferable also from the viewpoint of deterioration during drying and the drying cost, for example.

In a case where ingredients such as the aqueous monomer solution and the polymerization initiator are fed through a plurality of feeding positions into a polymerization reaction unit and mixed with one another inside the polymerization reaction unit, the water content described above of the aqueous monomer solution is defined as the water content of the aqueous monomer solution after the mixing. In other words, the water content described above corresponds to the total water content of the combination of all liquids fed into the polymerization reaction unit.

An appropriate amount of vapor (such as water vapor or vapor of any other monomer) is preferably produced for removal of polymerization heat generated during the polymerization reaction below (acrylic acid, for example, generates a polymerization heat of 18.5 cal/mol [25° C.]). Producing vapor involves latent heat of vaporization, which can remove polymerization heat. Further, the polymerization reaction unit below may have a controlled gas phase temperature.

(Polymerization Inhibitor in Aqueous Monomer Solution)

The aqueous monomer solution for the present invention preferably contains a polymerization inhibitor, more preferably a methoxyphenol, further preferably p-methoxyphenol, in an amount so that an acrylic acid (salt)-based aqueous monomer solution having a temperature can be fed stably into the polymerization reaction unit. Such a polymerization inhibitor may be the polymerization inhibitor contained in the acrylic acid, or an amount of a polymerization inhibitor may be added in a case where the amount of the polymerization inhibitor contained in the acrylic acid is decreased during the process of preparing the aqueous monomer solution. In this case, the aqueous monomer solution contains a polymerization inhibitor at a concentration preferably of not more than 200 ppm, more preferably of 10 ppm to 130 ppm, further preferably of 20 ppm to 100 ppm, with respect to the monomer.

The aqueous monomer solution is deoxygenated, in particular substituted with an inert gas, as necessary. The aqueous monomer solution, however, preferably contains an amount of oxygen dissolved therein in addition to the polymerization inhibitor from the viewpoint of stability of the aqueous monomer solution. In this case, the aqueous monomer solution contains dissolved oxygen in an amount preferably of 0.1 ppm to 15 ppm, more preferably of 0.1 ppm to 5 ppm, further preferably of 0.2 ppm to 1 ppm.

(Preparation of Aqueous Monomer Solution)

The acrylic acid (salt)-based aqueous monomer solution for the present invention is preferably prepared in advance by mixing the above components before the components are fed into the polymerization reaction unit below. The components may be mixed by a publicly known method such as a method of mixing the components in a stirring tank or a method involving use of a static mixer in piping. Alternatively, all or part of the aqueous monomer solution may be fed into the polymerization reaction unit below to prepare the acrylic acid (salt)-based aqueous monomer solution.

(2-2) Polymerization Step

This step is a step of polymerizing the aqueous monomer solution, which is prepared through the above-described preparation step, to prepare a crosslinked hydrogel polymer (hereinafter referred to as "hydrogel").

The polymerization step of the present invention (first invention) is carried out for a polymerization reaction of the acrylic acid (salt)-based aqueous monomer solution while the polymerization reaction unit, in which the polymerization reaction is caused, has internal pressure so controlled that the internal pressure is slightly reduced as compared to atmospheric pressure at the periphery of the polymerization reaction unit.

One embodiment of the present invention is a method for producing polyacrylic acid (salt)-based water-absorbing resin (first invention), the method being a method for producing polyacrylic acid (salt)-based water-absorbing resin, the method including a step of polymerizing an acrylic acid (salt)-based aqueous monomer solution, the polymerization step involving use of a polymerization reaction apparatus including a polymerization reaction unit covered with a casing, a polymerization reaction being caused under internal pressure of the polymerization reaction unit, the internal pressure being slightly reduced and having a pressure reduction level (defined by the pressure inside discharge piping) of more than 0 kPa and not more than 10 kPa relative to an ambient pressure at the periphery of the polymerization reaction unit.

(Form of Polymerization)

The monomer containing acrylic acid (salt) as a main component may be polymerized by, for example, bulk polymerization, spray polymerization, droplet polymerization, aqueous solution polymerization, reversed phase suspension polymerization, or precipitation polymerization. The monomer is, however, preferably polymerized by aqueous solution polymerization, that is, polymerized in the form of an aqueous solution, from the viewpoint of, for example, physical properties for a water-absorbing resin to be produced and ease of control of polymerization.

Such a polymerization method (aqueous solution polymerization) is disclosed in, for example, U.S. Pat. No. 4,625,001, No. 4769427, No. 4873299, No. 4093776, No. 4367323, No. 4446261, No. 4683274, No. 4690996, No. 4721647, No. 4738867, and No. 4748076, and U.S. Patent Application No. 2002/0040095.

The present invention is applicable preferably to aqueous solution polymerization, spray polymerization, and droplet polymerization, more preferably to aqueous solution polymerization, further preferably to continuous aqueous solution polymerization among others types of aqueous solution polymerization. The present invention is, among others, applicable particularly preferably to polymerization in the boiling state below (boiling polymerization; in particular, polymerization with a maximum reaching temperature of higher than 100° C.) or high-temperature starting polymerization (in particular, polymerization with a polymerization starting temperature of not lower than 40° C.). The present invention is applicable preferably to these forms of polymerization, each of which is easily influenced by the ambient temperature and tends to increase the volatile components. The maximum reaching temperature is measured with use of a thermometer of a contact type or a non-contact type, and refers to the temperature of a highest temperature portion of a hydrogel produced through a polymerization reaction.

(Polymerization Reaction Apparatus)

The polymerization reaction apparatus for use in the present invention is an apparatus configured to produce a hydrogel through a polymerization reaction involving use of the acrylic acid (salt)-based aqueous monomer solution as a raw material. The polymerization reaction apparatus includes a polymerization reaction unit in which a polymerization reaction is caused, a tank configured to measure and store components such as the aqueous monomer solution and the polymerization initiator, and a preparation tank in which the components are mixed with one another. A specific example of the polymerization reaction apparatus is a polymerization reaction apparatus disclosed in, for example, FIG. 3 of U.S. Patent Application No. 2004/0092688.

The polymerization reaction apparatus is provided with one or more devices that are disposed outside the polymerization reaction apparatus and that operate together with the polymerization reaction apparatus. While such devices may be regarded as being part of the polymerization reaction apparatus, those devices and the polymerization reaction apparatus may alternatively constitute a polymerization reaction system. In other words, the present invention also provides a polymerization reaction system including the polymerization reaction apparatus for use in the present invention.

(Polymerization Reaction Unit)

The term "polymerization reaction unit" as used for the present invention refers to a site (device) at which the polymerization reaction progresses as described above. The polymerization reaction unit preferably has functions below and a liquid contact portion below. The polymerization reaction unit may use a batch method or a continuous method. The polymerization reaction unit may be a publicly known device. A site at which the polymerization reaction does not progress, such as the storage tank or adjustment tank, is not included in the polymerization reaction unit.

The above device is preferably a continuous kneader polymerization device or a continuous belt polymerization device, more preferably a continuous belt polymerization device.

The polymerization reaction unit is further connected to piping (feeding piping) for feeding raw materials such as the aqueous monomer solution. The components such as the aqueous monomer solution are fed through the feeding piping into the polymerization reaction unit. The feeding piping may have any shape that allows liquid to be fed. The polymerization reaction section may be connected to a single feeding piping at a feeding position or to two or more feeding piping at respective feeding positions. In a case where the polymerization reaction unit has two or more feeding positions, the feeding piping may be used individually for the aqueous monomer solution, for the polymerization initiator, and for a reducing agent for a redox-type polymerization initiator, for example.

In a case where the polymerization reaction unit uses a batch method, a polymerization reaction may be started by feeding the aqueous monomer solution into the polymerization reaction unit and then covering the polymerization reaction unit with a casing or placing, in the polymerization reaction unit covered with a casing, a container in which the aqueous monomer solution has been fed. In a case where the polymerization reaction unit uses a continuous method, a polymerization reaction may be started by feeding the aqueous monomer solution continuously into the polymerization reaction unit covered with a casing.

The above casing is provided so as to prevent a component volatilizing from the aqueous monomer solution from being freely diffused to the outside of the polymerization reaction unit during polymerization. The casing may cover the entire polymerization reaction unit as in FIG. 1 of U.S. Patent Application No. 2005/0215734, for example.

The polymerization reaction unit preferably includes a temperature control unit to control the temperature during polymerization. The temperature control unit preferably includes a heat source such as an electric heater, vapor, or warm water. The temperature control unit more preferably includes warm water as a heat source from the viewpoint of safety and the range within which the temperature is controlled.

The temperature control unit can control the temperature during polymerization automatically as follows: An arithmetic unit (for example, a CPU), in a case where it has received information from a temperature sensor provided inside the polymerization reaction unit, executes program code stored in a recording medium and drives the temperature control unit to control the temperature during polymerization so that the temperature has a value. Such an arithmetic unit and recording medium may each be part of the polymerization reaction apparatus or of the polymerization reaction system. A single arithmetic unit and recording medium may perform a plurality of control operations, or alternatively, a plurality of arithmetic units and recording mediums may independently perform a plurality of control operations.

(Liquid Contact Portion)

The term "liquid contact portion" for the present invention refers to that area of the polymerization reaction unit which comes into contact with a liquid containing all components necessary for a polymerization reaction (that is, an aqueous monomer solution that contains acrylic acid (salt) as a monomer component as well as components such as an internal crosslinking agent and a polymerization initiator). Specifically, in a case where the polymerization reaction unit is a continuous belt polymerization device, the liquid contact portion corresponds to, for example, the endless belt and its side dams, which are included in the polymerization device.

The liquid contact portion may have any shape that includes a combination of a flat surface(s) and/or a curved surface(s) and that can be visually seen in a direction perpendicular to the liquid surface in contact with gas. Visually seeing the shape makes it possible to recognize gas accumulation while the aqueous monomer solution is being fed and to solve the problem of such gas accumulation early. Further, the above shape preferably allows a hydrogel produced to be taken out easily.

The liquid contact portion is made of any material that does not absorb or react with the aqueous monomer solution and that does not deteriorate by heat during polymerization. Specific examples include iron, aluminum, stainless steel, fluorine resin, and glass. The liquid contact portion is preferably made of a metal material having a thermal conductivity of not less than 1.0 W/m/K from the viewpoint of heat transfer because the liquid contact portion is industrially required to have a high mechanical strength.

Directly using the metal material may, however, let a trace amount of the metallic element elute into the aqueous monomer solution and lead to degraded physical properties for a water-absorbing resin to be produced. In view of that, the liquid contact portion is more preferably made of a metal material such as iron, aluminum, or stainless steel which metal material is provided with a coating having a thickness of not more than 5 mm and made of fluorine resin or silicone rubber, each of which is excellent in chemical and thermal stability, or fluorine resin, silicone rubber, or the like each of which contains polyvinyl chloride, polyphenylene sulfide, or glass fiber.

(Gas Discharge Outlet)

The present invention is arranged such that the polymerization reaction unit is provided with a gas discharge outlet as necessary to release, to the outside of the system, water, acrylic acid, and/or the like volatilizing during the polymerization step. The term "gas discharge outlet" refers to a site through which gas inside the polymerization reaction unit is discharged to the outside of the system. In the case where the polymerization reaction unit uses a continuous method, the gas discharge outlet may double as a hydrogel discharge port. Further, airflow is introduced as necessary into the polymerization reaction unit through the gas discharge outlet to remove polymerization heat during polymerization. The gas discharge outlet is hereinafter also referred to simply as "discharge outlet".

The polymerization reaction unit may be provided with an exhaust device (for example, an air blower or suction device) disposed outside the polymerization reaction unit to forcedly discharge gas from the polymerization reaction unit. The exhaust device simply needs to have an exhaust capability sufficient to prevent water, acrylic acid, and/or the like volatilizing from the aqueous monomer solution from being diffused freely to the outside of the system through a gap in the casing other than the discharge outlet or depending on the circumstances, lower the boiling temperature of the aqueous monomer solution. The discharge outlet is preferably connected to discharge piping. There is/are preferably provided an exhaust device and/or a collecting device described below on the path of the discharge piping. The discharge piping may have any shape that allows gas to be discharged from the polymerization reaction unit.

(Slightly Reduced Pressure)

The present invention involves a polymerization reaction performed in the polymerization reaction unit under slightly reduced pressure, that is, pressure with a pressure reduction level of more than 0 kPa and not more than 10 kPa, preferably of not more than 7 kPa, more preferably of not more than 5 kPa, further preferably of not more than 3 kPa, particularly preferably of not more than 2 kPa, most preferably of not more than 1 kPa, relative to the ambient pressure at the periphery of the polymerization reaction unit (in particular, the atmospheric pressure at the periphery of the polymerization device). The present invention, in other words, involves a polymerization reaction is carried out under conditions that internal pressure of the polymerization reaction unit is reduced by a range of more than 0 kPa to not more than 10 kPa relative to the ambient pressure at the periphery of the polymerization reaction unit. The pressure reduction level has a lower limit preferably of not less than 0.01 kPa, more preferably of not less than 0.02 kPa, further preferably of not less than 0.05 kPa.

The above expression "pressure reduction level" relative to the ambient pressure at the periphery of the polymerization reaction unit (in particular, atmospheric pressure at the periphery of the polymerization device)" refers to a difference in pressure (difference in atmospheric pressure) between the ambient pressure at the periphery of the polymerization reaction unit and the pressure inside the polymerization reaction unit (specifically, the pressure of the gas phase inside the polymerization reaction unit). This pressure difference is expressed as a positive value in a case where the pressure inside the polymerization reaction unit is lower than the ambient pressure. In a case where, for example, the ambient pressure at the periphery of the polymerization reaction unit is the standard atmospheric pressure (101.3 kPa), a pressure reduction level of 10 kPa means that the pressure inside the polymerization reaction unit is 91.3 kPa. Hereinafter, a "pressure reduction level" relative to the ambient pressure at the periphery of the polymerization reaction unit (in particular, the atmospheric pressure at the periphery of the polymerization device)" is also referred as simply as a "pressure reduction level".

The "ambient pressure at the periphery of the polymerization reaction unit (in particular, the atmospheric pressure around the polymerization device)" has a value that changes around 101.3 kPa due to the ambient temperature and/or the altitude, for example. The pressure reduction level simply needs to be controlled within the above range depending on the ambient pressure (in particular, the atmospheric pressure at the periphery of the polymerization device). Further, the ambient pressure at the periphery of the polymerization reaction unit (in particular, the atmospheric pressure at the periphery of the polymerization device) refers to pressure (atmospheric pressure) measured at a position away from the polymerization device (in particular, the gas discharge outlet) preferably by not more than 10 m, more preferably by not more than 1 m.

In a case where the discharge piping is connected to the polymerization reaction unit, the discharge piping is preferably provided with a manometer configured to measure the difference in pressure (pressure reduction level) between the pressure inside the polymerization reaction unit and the ambient pressure at the periphery of the polymerization reaction unit. The manometer is used to control the pressure reduction level. The term "pressure inside discharge piping" refers to the atmospheric pressure inside the discharge piping.

The slightly reduced pressure can help prevent gas (for example, air and/or inert gas) from excessively entering the polymerization reaction unit. This can reduce, for example, a decrease or a change in the gas phase temperature of the polymerization reaction unit, and thus allows the polymerization to be more uniform. The slightly reduced pressure is also preferable as it facilitates collecting, for example, water and organic matter (for example, acrylic acid) from discharged gas and reusing such water and organic matter.

(Pressure Adjustment Method)

The present invention is not particularly limited in terms of how to adjust the pressure inside the polymerization reaction unit within the above range of pressure reduction level. An example method is a method of controlling, for example, gas generated during a polymerization process (that is, water, acrylic acid, and/or the like volatilizing due to polymerization heat) and/or the amount of airflow (for example, air and/or inert gas) introduced into the polymerization reaction unit and the amount of gas discharged from the polymerization reaction unit (or the amount of gas sucked into the polymerization reaction unit).

The pressure reduction level may be monitored with use of a manometer for control or may be monitored on the basis of a value calculated from, for example, the discharged amount for control. In a case where the pressure reduction level is monitored with use of a manometer, the manometer simply needs to measure the difference between the atmospheric pressure inside the polymerization reaction unit and the atmospheric pressure at the periphery of (outside) the polymerization reaction unit. In a case where the pressure reduction level is defined by the pressure inside the discharge piping, the manometer is preferably disposed inside the discharge piping. Since the manometer indicates a value (gage pressure) expressed as a difference in pressure with respect to the atmospheric pressure, the pressure reduction level is preferably controlled on the basis of a measurement of the manometer. The pressure reduction level can be controlled automatically as follows: An arithmetic unit (for example, a CPU), in a case where it has received information from a difference in pressure sensor (manometer) configured to measure over time the atmospheric pressure difference between the atmospheric pressure inside the polymerization reaction unit and the atmospheric pressure (ambient pressure) outside (at the periphery of) the polymerization reaction unit, executes program code stored in a recording medium and drives a pressure control unit (that is, adjusts the amount of airflow introduced from the suction port and/or the amount discharged from the discharge outlet) to control the pressure reduction level of the atmospheric pressure of the inside of the polymerization reaction unit on the basis of the ambient pressure so that the pressure reduction level has a value. Such an arithmetic unit and recording medium may also each be part of the polymerization reaction apparatus or of the polymerization reaction system. A single arithmetic unit and recording medium may perform a plurality of control operations, or alternatively, a plurality of arithmetic units and recording mediums may independently perform a plurality of control operations.

The pressure inside the polymerization reaction unit is slightly reduced preferably by a method of discharging gas from the above discharge outlet, in particular. In a case where the polymerization reaction unit uses a continuous method and the discharge outlet doubles as a hydrogel discharge port, the polymerization reaction unit is preferably provided with a separate discharge outlet to discharge gas.

The polymerization reaction unit may be provided with any number of discharge outlets, but is preferably provided with one or more discharge outlets, more preferably a plurality of discharge outlets. In the case where the polymerization reaction unit uses a continuous method, in particular, the polymerization reaction unit is provided with preferably 1 to 100 discharge outlets, more preferably 2 to 80 discharge outlets, further preferably 3 to 60 discharge outlets, particularly preferably 5 to 50 discharge outlets. Providing discharge outlets in a number within the above range allows for uniform polymerization, and facilitates collecting volatilized components (for example, water and/or organic matter such as acrylic acid).

The present invention, as described above, also provides a polymerization reaction apparatus for polyacrylic acid (salt)-based water-absorbing resin which polymerization reaction apparatus includes a polymerization reaction unit provided with a discharge outlet and covered with a casing. The polymerization reaction apparatus of the present invention may be part of a polymerization reaction system. In other words, the polymerization reaction system of the present invention includes the polymerization reaction apparatus of the present invention.

One embodiment of the present invention is a polymerization reaction apparatus (second invention) for polyacrylic acid (salt)-based water-absorbing resin which polymerization reaction apparatus includes a polymerization reaction unit provided with a discharge outlet and covered with a casing.

The polymerization reaction apparatus of the present invention is preferably provided with discharge piping connected to the discharge outlet to prevent discharged gas from being diffused around the discharge outlet. The polymerization reaction apparatus is more preferably provided further with a manometer configured to measure the pressure difference between the internal pressure of the polymerization reaction unit and the ambient pressure at the periphery of the polymerization reaction unit. The polymerization reaction apparatus of the present invention is, in other words, a polymerization reaction apparatus for polyacrylic acid (salt)-based water-absorbing resin which polymerization reaction apparatus includes a polymerization reaction unit provided with a discharge outlet and covered with a casing, discharge piping connected to the discharge outlet, and a manometer configured to measure the pressure difference between the internal pressure of the polymerization reaction unit and the ambient pressure at the periphery of the polymerization reaction unit. The manometer is preferably disposed on the discharge piping so as not to adversely influence a polymerization reaction.

The polymerization reaction apparatus of the present invention is preferably provided with a plurality of discharge outlets, in which case the polymerization reaction apparatus is preferably provided with a plurality of discharge pipings connected to the plurality of respective discharge outlets.

The polymerization reaction apparatus may be provided further with a plurality of manometers for the plurality of respective discharge piping. If the plurality of manometers indicate different values, it is simply necessary that the pressure reduction level indicated by at least one manometer be within the range for the present invention. Further, if the plurality of manometers indicate different values, that may be because discharge piping is clogged, for example. It is thus preferable to rely on a manometer that indicates a lower value for the pressure reduction level.

(Gas Fed from Outside)

The polymerization reaction unit of the present invention has internal pressure reduced by the exhaust device discharging gas. During this operation, gas is fed into the polymerization reaction unit from the outside thereof through an opening (air inlet) other than the discharge outlet. In this case, the pressure reduction level defined for the present invention applies. The present specification uses expressions such as "feeding" of gas or the like into the polymerization reaction unit interchangeably with expressions such as "introduction (entry)" thereof.

The gas to be fed is not limited to any particular one, and may be, for example, air, inert gas (for example, nitrogen), water vapor, or a mixed gas thereof. The gas to be fed is, among others, preferably air or a mixed gas containing air as a main component because for the present invention, such gas is not likely influenced by polymerization inhibition caused by oxygen. The gas to be fed is preferably air or a mixed gas containing air as a main component also because such gas allows the polymerization inhibitor (in particular, a methoxyphenol) to act more effectively, prevents unexpected polymerization of the acrylic acid (salt)-based monomer, reduces the risk of oxygen deficiency on the field of production, and allows polyacrylic acid (salt)-based water-absorbing resin to be produced at lower costs. The expression "main component" indicates that air is contained at a proportion preferably of not less than 50% by volume, more preferably of not less than 70% by volume. The air or mixed gas containing air as a main component simply needs to have a relative humidity of not more than 70% RH at the gas phase temperature of the polymerization reaction unit.

The gas to be fed has a temperature preferably of lower than 50° C., more preferably of lower than 45° C., further preferably of lower than 40° C., because the polymerization step is influenced by the temperature of outside air. The temperature has a lower limit preferably of not less than −20° C., more preferably of not less than 0° C.

The present invention is suitably applicable in a case where the gas to be fed has a temperature that changes on a time basis (for example, an hour-to-hour basis), a time-period basis, a day-to-day basis, or a season-to-season basis within the range preferably of 5° C. to 40° C., more preferably of 6° C. to 30° C., further preferably of 7° C. to 20° C., particularly preferably of 8° C. to 15° C. The expression "vary according to the time (for example, time point) within a range" refers to how much the temperature changes every time point of the day. The expression "vary according to the season within a range" refers to how much the temperature changes between, for example, summer and winter of the year. The range of the variation may be selected as appropriate from among, for example, the maximum temperature, the minimum temperature, and the average temperature of the period.

Applying the present invention controls the range of change in the gas phase temperature of the polymerization reaction unit so that the range is preferably ±2° C., more preferably ±1° C.

In order for the polymerization reaction unit to have a gas phase temperature within the above range, the polymerization reaction unit has reduced pressure, and in addition, a gas feeding unit having a suction port through which gas is fed in an auxiliary manner into the polymerization reaction unit from the outside thereof may be provided with a temperature control unit configured to control the temperature of the gas to be fed. The temperature control unit preferably includes a heat source such as an electric heater, vapor, or warm water. The temperature control unit more preferably includes warm water as a heat source from the viewpoint of safety and the range within which the temperature is controlled.

The temperature of the gas being fed into the polymerization reaction unit can be controlled automatically as follows: An arithmetic unit (for example, a CPU), in a case where it has received information from a temperature sensor provided inside the gas feeding unit, executes program code stored in a recording medium and drives the temperature control unit to control the temperature of the gas being fed into the polymerization reaction unit from the outside thereof so that the temperature has a value. Such an arithmetic unit and recording medium may also each be part of the polymerization reaction apparatus or of the polymerization reaction system. A single arithmetic unit and recording medium may perform a plurality of control operations, or alternatively, a plurality of arithmetic units and recording mediums may independently perform a plurality of control operations.

The gas is fed per minute in an amount preferably of 0.001 times to 1000 times, more preferably of 0.01 times to 100 times, further preferably of 0.1 times to 10 times, the internal volume of the polymerization reaction unit. It is preferable that the temperature of the gas fed into the polymerization reaction unit from the outside thereof and the amount of the gas fed are each controlled within the above range. This is because in such a case, the present invention exhibits greater effects.

(Weight of Aqueous Monomer Solution Per Unit Area of Liquid Contact Portion)

The present invention is arranged such that that area of the polymerization reaction unit which is in contact with the aqueous monomer solution is selected in accordance with, for example, the kind of the polymerization device and/or the charged amount of the aqueous monomer solution. The aqueous monomer solution has a weight per unit area of the liquid contact portion, which is in contact with the aqueous monomer solution, which weight is preferably 5 kg/m$^2$ to 100 kg/m$^2$, more preferably 5 kg/m$^2$ to 50 kg/m$^2$, further preferably 5 kg/m$^2$ to 25 kg/m$^2$, particularly preferably 10 kg/m$^2$ to 20 kg/m$^2$.

A small weight per unit area of the liquid contact portion (for example, less than 5 kg/m²) will decrease the productivity. Such a small weight will also cause polymerization heat generated by a polymerization reaction to be removed so rapidly as to decrease the polymerization rate and possibly prevent a water-absorbing resin to be produced from having desired physical properties. On the other hand, a large weight per unit area of the liquid contact portion (for example, more than 100 kg/m²) will cause polymerization heat generated by a polymerization reaction to be removed so slowly as to prevent the present invention from producing its effects sufficiently.

The pressure inside the polymerization reaction unit is adjusted as above, and in addition, the polymerization of the aqueous monomer solution per unit area of the liquid contact portion is within the above range. This helps stabilize the polymerization, and can remove polymerization heat moderately. This can in turn prevent, for example, degraded physical properties and generation of fine powder.

When the weight of the aqueous monomer solution per unit area is found, the unit area is not an area simply found on the basis of the outer dimensions of the polymerization device, but the total area of the site in actual contact with the aqueous monomer solution. In a case where, for example, the liquid contact portion has a wave shape with a curved structure or a structure including an internal partition, the area is calculated in view of such a shape. No consideration is needed of a change of the liquid contact portion due to swelling or shrinking of a hydrogel produced by a polymerization reaction. Further, no consideration is needed, as a contact area, of contact with a stirrer such as a stirring blade for stirring the aqueous monomer solution.

(Temperature of Aqueous Monomer Solution)

The present invention is arranged such that the aqueous monomer solution fed into the polymerization reaction unit has a temperature normally of not lower than room temperature (20° C. to 25° C.), preferably of not lower than 40° C., more preferably of not lower than 50° C., further preferably of not lower than 60° C. Further, the temperature has an upper limit preferably of lower than 100° C.

The temperature of the aqueous monomer solution refers to the temperature thereof at the time point at which the aqueous monomer solution is fed into the polymerization reaction unit, that is, the temperature thereof before the aqueous monomer solution comes into contact with the polymerization reaction unit (that is, the liquid contact portion). The temperature of the aqueous monomer solution may also be referred to as a "polymerization starting temperature". In a case where, for instance, an aqueous monomer solution prepared is stored in a reserve tank or the like, the temperature of the aqueous monomer solution refers to the temperature thereof at the time point at which the aqueous monomer solution is actually fed into the polymerization reaction unit. This case simply needs the reserve tank or the like to be provided with a temperature sensor configured to sense the temperature of the aqueous monomer solution and a temperature control unit configured to control the temperature of the aqueous monomer solution fed into the polymerization reaction unit. Further, with the polymerization reaction unit having a plurality of feeding positions, an aqueous monomer solution is prepared in the polymerization reaction unit, in which case the temperature of the aqueous monomer solution refers to the temperature of a liquid containing all the raw materials at the time point at which feeding of those raw materials is completed. This case simply needs the polymerization reaction unit to include a liquid phase unit provided with a temperature sensor configured to sense the temperature of the aqueous monomer solution and be provided with a temperature control unit configured to control the temperature of the aqueous monomer solution at the time at which the feeding is completed. The temperature control unit preferably includes a heat source such as an electric heater, vapor, or warm water. The temperature control unit more preferably includes warm water as a heat source from the viewpoint of safety and the range within which the temperature is controlled.

It is important that the temperature of the aqueous monomer solution be kept at not less than a value, preferably within the above temperature range, until polymerization starts. In other words, the temperature of the aqueous monomer solution preferably does not become lower than room temperature, particularly lower than 40° C., between the preparation of the aqueous monomer solution and the start of polymerization. This allows the polymerization to be uniform for improved physical properties, and can prevent an increase in the amount of fine powder generated due to, for example, drying caused by excessive foaming, crushing, and/or any later process damage.

The temperature of the aqueous monomer solution can be controlled automatically as follows: An arithmetic unit (for example, a CPU), in a case where it has received information from the temperature sensor described above, executes program code stored in a recording medium and drives the temperature control unit to control the temperature of the aqueous monomer solution so that the temperature has a value. Such an arithmetic unit and recording medium may also each be part of the polymerization reaction apparatus or of the polymerization reaction system. A single arithmetic unit and recording medium may perform a plurality of control operations, or alternatively, a plurality of arithmetic units and recording mediums may independently perform a plurality of control operations.

If the temperature of the aqueous monomer solution becomes lower than room temperature, particularly lower than 40° C., before the aqueous monomer solution is fed into the polymerization reaction unit, the aqueous monomer solution will need to be heated before being fed into the polymerization reaction unit. Such heating is, however, not preferable because it will cause unexpected polymerization or undesirable reaction resulting in a change in nature.

Further, if the temperature of the aqueous monomer solution is lower than room temperature, particularly lower than 40° C., the polymerization will require a considerably long time period before its completion or let polymerization start partially at the liquid contact portion, which has a temperature higher than the temperature of the aqueous monomer solution. This undesirably prevents production of a uniform hydrogel. If the temperature of the aqueous monomer solution is not lower than 100° C., such disadvantages as follows undesirably occur: Polymerization reaction starts before the aqueous monomer solution is fed into the polymerization reaction unit, preventing the present invention from producing its effects; or the monomer component volatilizes, making it impossible to produce a water-absorbing resin having desired physical properties.

(Maximum Reaching Temperature)

The present invention is arranged such that the maximum reaching temperature during polymerization (polymerization peak temperature) is preferably not lower than 100° C., more preferably higher than 100° C. (boiling state). A maximum reaching temperature of not lower than 100° C. can reduce fine powder generated by foaming during high-temperature polymerization and also improve the productivity. Further, the maximum reaching temperature is preferably not higher than 150° C., more preferably not higher than 140° C., further preferably not higher than 130° C., particularly preferably not higher than 120° C., most preferably not higher than 115° C., from the viewpoint of the physical properties of a water-absorbing resin to be produced.

(Polymerization Time Period)

The present invention is arranged such that polymerization lasts for a time period (polymerization time period) preferably of not longer than 60 minutes, more preferably of not longer than 30 minutes, further preferably of not longer than 10 minutes, particularly preferably of not longer than 5 minutes, most preferably of not longer than 3 minutes. The polymerization time period has a lower limit preferably of not shorter than 0.1 minutes, more preferably of not shorter than 0.5 minutes.

The polymerization time period refers to the time period extending from the start of the polymerization to the end of the polymerization (that is, the time point at which the reaction product is discharged from the polymerization reaction apparatus). The polymerization time period is normally not shorter than the time period extending from the start of the polymerization to the time point at which the maximum reaching temperature is reached (that is, a polymerization peak time period), preferably [polymerization time period]>[polymerization peak time period], more preferably the polymerization peak time period is preferably 1/10 to 9/10, more preferably 1/5 to 4/5, of the total polymerization time period.

The polymerization time period may be selected as appropriate depending on, for example, the amount and/or temperature of the aqueous monomer solution to be fed and/or the kind and/or amount of the polymerization initiator to be added. Setting the polymerization time period as above allows for production of a water-absorbing resin having improved physical properties, can improve the productivity, and also helps reduce fine powder.

(Water Content of Hydrogel)

The present invention is arranged such that the hydrogel produced through the polymerization reaction has a water content at the time point of the end of the polymerization reaction which water content is, depending on the water content of the aqueous monomer solution, preferably 10 weight % to 70 weight %, more preferably 15 weight % to 65 weight %, further preferably 30 weight % to 55 weight %, with an upper limit being not more than the water content of the aqueous monomer solution.

The water content of the hydrogel decreases due mainly to moisture evaporate during the polymerization process. The difference between the water content of the hydrogel and the water content of the aqueous monomer solution ([the water content of the aqueous monomer solution]−[water content of the hydrogel]) is preferably not less than 1 weight %, more preferably not less than 5 weight %, further preferably not less than 8 weight %. The difference is not particularly limited in terms of its upper limit. The upper limit is, however, preferably not more than 70 weight %, more preferably not more than 50 weight %, further preferably not more than 30 weight %, to avoid overheating during the polymerization process. The water content of the hydrogel may be adjusted by controlling, for example, the amount of the gas to be fed and/or the pressure inside the polymerization reaction unit.

If the difference between the water content of the hydrogel and the water content of the aqueous monomer solution is small (for example, less than 1 weight %), it indicates that a small amount of water evaporates during the polymerization process. In such a case, however, polymerization heat generated by a polymerization reaction is removed insufficiently, which in turn considerably raises the temperature of the polymerization reaction unit. This may make it impossible to produce a water-absorbing resin having desired physical properties.

(Rate of Volatilization)

The present invention is preferably applicable to a polymerization method including a polymerization step in which a volatile component volatilizes and in which the rate of volatilization is preferably not less than 1 weight %, more preferably not less than 5 weight %, further preferably not less than 10 weight %. The "rate of volatilization" has a value defined by the equation below from the overall weight of an aqueous monomer solution fed during the polymerization step and the overall weight of a hydrogel produced through the polymerization step.

$$\text{Rate of volatilization}(\%) = 100 - (\text{overall weight hydrogel produced during the polymerization step})/(\text{overall weight of an aqueous monomer solution fed during the polymerization step}) \times 100 \quad [\text{Math. 1}]$$

As described above, the rate of volatilization can be found on the basis of how much the weight changes through the polymerization.

The present invention is arranged such that the polymerization reaction unit has internal pressure controlled by an exhaust device so that the internal pressure is slightly reduced (with a pressure reduction level of more than 0 kPa and not more than 10 kPa). The present invention may be arranged to, during such control, discard gas discharged from the discharge outlet of the polymerization reaction unit or separate inert gas and/or components volatilizing during the polymerization reaction (including water and/or acrylic acid) and reuse effective components directly or after enrichment. The present invention may alternatively be arranged to further mix inert gas, air, and/or the like with the effective components to adjust the composition or adjust the temperature of the effective components to a value before reusing the effective components. The effective components are preferably water and acrylic acid.

(Collecting Method of Present Invention)

The present invention also provides a method for collecting a volatile component including water and/or acrylic acid which volatile component is discharged during the step of polymerizing an acrylic acid (salt)-based aqueous monomer solution. The collecting method is characterized in that the volatile component is collected while the pressure inside the polymerization reaction unit is slightly reduced pressure with a pressure reduction level with respect to the pressure of the atmosphere at the periphery of the polymerization reaction unit.

One embodiment of the present invention is a method (third invention) for collecting a volatile component including water and/or acrylic acid which volatile component is discharged during the step of polymerizing an acrylic acid (salt)-based aqueous monomer solution, the pressure inside the polymerization reaction unit being slightly reduced pressure and having a pressure reduction level (defined by the pressure inside discharge piping) of more than 0 kPa and not more than 10 kPa relative to the ambient pressure at the periphery of the polymerization reaction unit.

The present invention is arranged, as described above, such that a volatile component volatilizes during the polymerization step and that the volatile component is discharged to the outside of the polymerization reaction unit with gas fed into the polymerization reaction unit from the outside thereof under the slightly reduced pressure. The volatile component is collected by the collecting method of the present invention. Further, the polymerization reaction unit having slightly reduced pressure allows the volatile component to be collected efficiently.

If the pressure inside the polymerization reaction unit is atmospheric pressure or increased pressure, the volatile component will tend to remain in the polymerization device, with the result that a water-absorbing resin produced will have unstable physical properties. On the other hand, if the pressure inside the polymerization reaction unit is excessively reduced pressure, it is not preferable because such low pressure will, for example, decrease the efficiency of collecting the volatile component and/or require a high-power collecting device, with the result of higher running costs, and the ambient temperature will influence the polymerization reaction so greatly that the polymerization reaction unit will have a gas phase temperature that changes over a wide range.

A preferable method for collecting the volatile component is a method of, after the volatile component is discharged to the outside of the system through the discharge outlet of the polymerization reaction unit, collecting the volatile component by cooling or with use of water outside the polymerization reaction apparatus.

Specific examples of the method for collecting the volatile component by cooling include a method (condensation) of feeding gas containing the volatile component into a heat exchanger containing a refrigerant having a temperature preferably of −50° C. to 50° C., more preferably of 0° C. to 40° C., to condense gas containing the volatile component. Specific examples of the method for collecting the volatile component with use of water include a method (water collecting) of feeding gas containing the volatile component into a collecting tower that contains, for example, a sodium hydroxide aqueous solution as collecting water to utilize gas-liquid contact inside the collecting tower.

The above operation, preferably the combinational use of the agglomerate and the water collecting, collects preferably not less than 90%, more preferably not less than 95%, further preferably not less than 99%, particularly preferably not less than 99.9%, of the volatile component. This collect rate may specifically be a rate of recovery of an acrylic acid aqueous solution.

While the rate of volatilization can, as described above, be found on the basis of how much the weight changes through the polymerization, the collect rate can be found on the basis of the weight of the volatile component collected (for example, an acrylic acid aqueous solution).

The volatile component collected may partly or wholly be reused directly in the process of producing a water-absorbing resin, may be refined as necessary, or may be discarded. In a case where the volatile component collected is reused in the production process, the volatile component is reused preferably in the polymerization step. In this case, the volatile component collected is preferably, depending on the volatile component collected (that is, the respective proportions of acrylic acid, water, and the like), mixed with an amount(s) of acrylic acid, water, an internal crosslinking agent, and/or the like in the step for preparing an aqueous monomer solution before being reused in the polymerization step. Gas from which the volatile component has been removed can be discharged into atmospheric air.

In a case where the present invention uses a collecting tower to collect the volatile component, the present invention can use, for example, a sodium hydroxide aqueous solution as collecting water as described above. The collecting water is, however, preferably an alkali aqueous solution such as a hydroxide of an alkali metal, a carbonate, a hydrogencarbonate, and the like from the viewpoint of collecting efficiency. The alkali aqueous solution is preferably an aqueous solution of sodium hydroxide, sodium carbonate, or sodium bicarbonate which aqueous solution contains not more than 100 ppm of a polyhydric metal salt.

The alkali aqueous solution contains an alkali at a concentration adjusted preferably to a pH of 7 to 14, more preferably to a pH of 9 to 11, from the viewpoint of collecting efficiency. The alkali concentration being within the above range is preferable because in such a case, the amount of an alkali used can be reduced. Further, the alkali contains a polyhydric metal salt (mainly, Fe ions) in an amount preferably of not more than 100 ppm, or in order of increasing preferability, not more than 20 ppm, not more than 10 ppm, not more than 5 ppm, not more than 1 ppm, not more than 0.5 ppm, or most preferably not more than 0.1 ppm. Containing a polyhydric metal salt in a large amount is not preferable because in such a case, a salt as a neutralized product adheres to, for example, a collecting liquid spraying nozzle and/or a filling layer for gas-liquid contact in the collecting tower, with the result of clogging.

The present invention is arranged such that in a case where the volatile component is to be fed into a collecting tower, gas containing the volatile component has a temperature preferably of 30° C. to 150° C., more preferably of 50° C. to 130° C., further preferably of 80° C. to 120° C. Further, heat recovery with use of a heat exchanger is preferably performed as necessary. In this case, the heat exchanger has a specific cooling output preferably of more than 0 W/cm$^2$ and not more than 10 W/cm$^2$, more preferably of 0.012 W/cm$^2$ to 5 W/cm$^2$, further preferably of 0.1 W/cm$^2$ to 2 W/cm$^2$. The heat exchanger having a specific cooling output of more than 10 W/cm$^2$ is not preferable because such a case is disadvantageous in terms of energy and may cause gas containing the volatile component to be separated out due to excessive cooling.

The collecting device configured to perform the above collecting operation is disposed outside the polymerization reaction apparatus, and may thus be regarded as being part of the polymerization reaction system. Examples of the collecting device include, but are not limited to, a heat exchanger and a collecting tower as described above. A volatile component that has volatilized during the polymerization step is, as described above, discharged to the outside of the polymerization reaction unit through discharge piping with gas fed into the polymerization reaction unit from the outside thereof under the slightly reduced pressure. The collecting device is thus disposed on the path of the discharge piping connected to the discharge outlet of the polymerization reaction apparatus.

The collect of the volatile component in accordance with the present invention is efficiently performed in combination with the polymerization reaction apparatus. This means that the polymerization reaction system of the present invention, which includes the polymerization reaction apparatus and the collecting device, may also be regarded as a system for collecting a volatile component.

(2-3) Gel-Crushing Step

This step is a step of gel-crushing the hydrogel, produced through the polymerization step, with use of, for example, a kneader, a screw extruder such as a meat chopper, or a gel-crusher such as a cutter mill to produce a hydrogel in a particulate form (hereinafter referred to as "particulate hydrogel"). In a case where the polymerization step involves kneader polymerization, the polymerization step and the gel-crushing step are carried out simultaneously.

This step may further include adding, for example, water, a polyhydric alcohol, a liquid mixture of water and a polyhydric alcohol, a solution containing water and a polyhydric metal salt dissolved in the water, or a vapor of any of the above to the hydrogel before gel-crushing.

Gel-crushing conditions and forms other than the above that are suitably used for the present invention are disclosed in International Publication No. 2011/126079.

The particulate hydrogel produced through this step has a resin solid content preferably of 10 weight % to 70 weight %, more preferably of 15 weight % to 65 weight %, further preferably of 30 weight % to 55 weight %. The particulate hydrogel has a weight average particle diameter (D50) preferably of 0.2 mm to 10 mm, more preferably of 0.3 mm to 5 mm, further preferably of 0.5 mm to 3 mm. The particulate hydrogel contains particles each with a particle diameter of not less than 5 mm at a proportion preferably of not more than 10 weight %, more preferably of not more than 5 weight % (with a lower limit of 0 weight %). The particulate hydrogel preferably has a particle size (that is, a weight average particle diameter [D50] or a particle size distribution) within the above range because such a particle size allows for an increase in efficiency during a step such as the drying step or a crushing step.

The particle size of the particulate hydrogel is defined by a wet classification method disclosed in Japanese Patent Application Publication, No. 2000-063527 A.

(2-4) Drying Step

This step is a step of drying the particulate hydrogel, produced through the polymerization step and/or gel-crushing step, for a desired resin solid content to produce a dried polymer. The resin solid content is found from an amount lost from drying (that is, a weight change caused to 1 g of water-absorbing resin upon heating at 180° C. for 3 hours). The resin solid content is preferably not less than 80 weight %, more preferably 85 weight % to 99 weight %, further preferably 90 weight % to 98 weight %, particularly preferably 92 weight % to 97 weight %.

The particulate hydrogel may be dried by any method. Example methods include thermal drying, hot air drying, drying under reduced pressure, fluidized bed drying, infrared drying, microwave drying, drum dryer drying, drying by azeotropic dehydration with a hydrophobic organic solvent, and high humidity drying by use of high temperature water vapor. The drying method is, among others, preferably hot air drying, more preferably band drying, in which hot air drying is performed on a through-flow belt, from the viewpoint of drying efficiency.

The hot air drying has a drying temperature (that is, the temperature of hot air) preferably of 120° C. to 250° C., more preferably of 150° C. to 200° C., from the viewpoint of the color of a water-absorbing resin to be produced and drying efficiency. Drying conditions other than the drying temperature such as the velocity of hot air and the drying time period may be selected as appropriate depending on the moisture content, the total weight, and/or the like of a particulate hydrogel to be dried and a target resin solid content. In a case where the drying method is band drying, conditions disclosed in, for example, International Publications No. 2006/100300, No. 2011/025012, No. 2011/025013, and No. 2011/111657 apply as appropriate.

The dried polymer produced through this step has a moisture content preferably of not more than 15 weight %, more preferably of not more than 10 weight %, further preferably of not more than 8 weight %, particularly preferably of not more than 5 weight %. Further, setting each of the drying temperature, the drying time period, and the like within the above range allows a water-absorbing resin to be produced to have a CRC (fluid retention capacity), an Ext (water soluble component), a color, and the like each within a desired range (see [3] below).

International Publication No. 2012/144595 discloses a method for drying water-absorbing resin (in particular, a particulate hydrogel) with use of a traverse conveyor. This method is a preferable embodiment of the present invention. Further, grain-refining the hydrogel to an appropriate size in advance can improve the efficiency of the drying step and its next step (crushing step).

(2-5) Crushing Step and Classification Step

These steps are steps of crushing the dried polymer, produced through the drying step (crushing step), and adjusting the particle size of the crushed polymer to a particle size within a range (classification step) to produce water-absorbing resin powder (for convenience, water-absorbing resin in a powder form before being subjected to surface crosslinking is herein referred to as "water-absorbing resin powder").

The crushing method, the classification method, and the like for the present invention are not limited to any particular methods, and may each be a publicly known technique selected as appropriate depending on the shape, the strength, and the like of the dried polymer and the particle size of water-absorbing resin powder to be produced. Specifically, the crushing step uses, for example, at least one crusher selected from, for example, a high-speed rotating crusher such as a roll mill, a hammer mill, a screw mill, and a pin mill, a vibrating mill, a knuckle type crusher, and a cylindrical mixer. The classification step involves, for example, sieve classification with use of a JIS standard sieve (JIS Z8801-1 (2000)), airflow classification, or the like. If in the gel-crushing step the hydrogel is fine refined to a desired size, these steps (namely, the crushing step and the classification step) may be omitted.

Further, the particle size of water-absorbing resin is adjusted not necessarily during the crushing step or classification step, but may alternatively be adjusted as appropriate during the polymerization step (in particular, in reversed phase suspension polymerization or spray droplet polymerization, for example) or other steps (for example, a granulating step or a fine powder recycling step).

The water-absorbing resin powder produced through this step has a weight average particle diameter (D50) preferably of 100 µm to 600 µm, more preferably of 200 µm to 500 µm, further preferably of 250 µm to 450 µm, particularly preferably of 300 µm to 400 µm. The water-absorbing resin powder contains particles each with a particle diameter of less than 150 µm at a proportion preferably of not more than 10 weight %, more preferably of not more than 5 weight %, further preferably of not more than 1 weight %. The water-absorbing resin powder contains particles each with a particle diameter of not less than 850 µm at a proportion preferably of not more than 5 weight %, more preferably of not more than 3 weight %, further preferably of not more than 1 weight %. The proportions of the above particles each preferably have a lower limit as low as possible, desirably 0 weight %, acceptably approximately 0.1 weight %. The water-absorbing resin powder has a particle size distribution with a logarithm standard deviation ($\sigma\zeta$) preferably of 0.20 to 0.50, more preferably of 0.25 to 0.40, further preferably of 0.27 to 0.35. The above particle sizes are measured in conformity with a measuring method disclosed in, for example, U.S. Pat. No. 7,638,570 or EDANA ERT 420.2-02 with use of a JIS standard sieve.

The above particle sizes are not only of water-absorbing resin after surface crosslinking (for convenience, hereinafter also referred to as "water-absorbing resin particles"), but also of water-absorbing resin as a finished product. Water-absorbing resin particles are thus preferably subjected to a surface-crosslinking treatment (surface-crosslinking step) in such a manner as to maintain the particle size within the above range. The particle size is more preferably adjusted during a sizing step after the surface-crosslinking step.

(2-6) Fine Powder Recycling Step

This step is a step of recovering fine powder (that is, fine particles containing not less than 70 weight % of particles each with a particle diameter of less than 150 µm) of water-absorbing resin which fine powder has been removed during steps such as the classification step and as necessary, reusing the fine powder during a step before the classification step such as the polymerization step, the gel-crushing step, or the drying step.

Specifically, this step is a step of classifying the dried polymer with use of a standard sieve having a mesh size of 45 µm to 250 µm, for example, a standard sieve having a mesh size of 150 µm, during the classification step, removing fine powder having passed through the standard sieve (hereinafter also referred to as "particles having passed"), and reusing, during a step before the classification step (in particular, the polymerization step, the gel-crushing step, or the drying step), the fine powder removed or the fine powder to which water has been added.

The fine powder recycling step is preferable because it improves the liquid permeability (for example, SFC) by fine powder removal and increases the water absorption speed (for example, FSR) by addition of fine powder to, for example, the aqueous monomer solution or the hydrogel.

(2-7) Surface-Crosslinking Step

This step is a step of forming a portion with a higher crosslinking density in a surface layer (that is, a portion of the water-absorbing resin powder which portion is several tens of micrometers deep from the surface) of the water-absorbing resin powder produced through the above steps. This step includes a mixing step, a heat treatment step, and optionally a cooling step.

The surface crosslinking for the present invention may be performed through crosslinking reaction with a surface-crosslinking agent, or may alternatively be, for example, radical crosslinking, surface polymerization, or crosslinking with use of active energy rays.

(Surface-Crosslinking Agent)

The surface-crosslinking agent for use in the present invention is not limited to any particular one, and may be an organic or inorganic surface-crosslinking agent. The surface-crosslinking agent is, among others, preferably an organic surface-crosslinking agent that reacts with a carboxyl group from the viewpoint of, for example, the physical properties of a water-absorbing resin to be produced and ease of use of the surface-crosslinking agent. The surface-crosslinking agent is, for example, one or a combination of two or more of the surface-crosslinking agents disclosed in U.S. Pat. No. 7,183,456. More specific examples include a polyhydric alcohol compound, an epoxy compound, a haloepoxy compound, a polyhydric amine compound or a condensate thereof with a haloepoxy compound, an oxazoline compound, an oxazolidinone compound, a polyhydric metal salt, an alkylenecarbonate compound, and a cyclic urea compound. The surface-crosslinking agent is, among the above, preferably one or a combination of two or more of a polyhydric alcohol compound, an epoxy compound, an oxazolidinone compound, and an alkylenecarbonate compound, more preferably an organic surface-crosslinking agent used together with or separately from an inorganic surface-crosslinking agent (ionic bonding surface-crosslinking agent), from the viewpoint of liquid permeability improvement.

The surface-crosslinking agent is used in an amount (for each of the organic surface-crosslinking agent and the inorganic surface-crosslinking agent) preferably of 0.001 parts by weight to 10 parts by weight, more preferably of 0.01 parts by weight to 5 parts by weight, with respect to 100 parts by weight of the water-absorbing resin powder.

The surface-crosslinking agent is preferably added in the form of an aqueous solution. In this case, water is used in an amount preferably of 0.1 parts by weight to 20 parts by weight, more preferably of 0.5 parts by weight to 10 parts by weight, with respect to 100 parts by weight of the water-absorbing resin powder. Further, in a case where a hydrophilic organic solvent is used as necessary, the hydrophilic organic solvent is used in an amount preferably of not more than 10 parts by weight, more preferably of not more than 5 parts by weight, with respect to 100 parts by weight of the water-absorbing resin powder.

The present invention covers in its scope the descriptions under the headings "Organic surface-crosslinking agent", "Inorganic surface-crosslinking agent", and "Other additives for surface-crosslinking agent" disclosed in International Publication No. 2013/073682.

(Mixing Step)

This step is a step of mixing the surface-crosslinking agent with the water-absorbing resin powder. The surface-crosslinking agent may be mixed by any method. An example method is a method of preparing a surface-crosslinking agent solution in advance and preferably spraying or dropping, more preferably spraying, the liquid onto the water-absorbing resin powder for mixture.

The above mixing may be performed with use of any device. The device is preferably a high-speed stirring mixer, more preferably a high-speed stirring continuous mixer.

(Heat Treatment Step)

This step is a step of heating the mixture discharged during the mixing step to cause crosslinking reaction on the surface of the water-absorbing resin powder.

The crosslinking reaction may be performed with use of any device. The device is preferably a paddle dryer. The crosslinking reaction has a reaction temperature set as appropriate depending on the kind of the surface-crosslinking agent used. The reaction temperature is preferably 50° C. to 300° C., more preferably 100° C. to 200° C.

(Cooling Step)

This step is an optional step performed as necessary after the heat treatment step.

The cooling may be performed with use of any device. The device is preferably a device having the same specs as the device for the heat treatment step, more preferably a paddle dryer. Replacing a heat medium with a coolant allows the device for the heat treatment step to be used as a cooling device. The water-absorbing resin particles resulting from the heat treatment step are forcedly cooled during the cooling step as necessary to preferably 40° C. to 80° C., more preferably 50° C. to 70° C.

(2-8) Other Steps

The present invention may as necessary include, in addition to the above-described steps, steps such as a granulation step, a sizing step (that is, classification after surface crosslinking), a fine powder removing step, and a fine powder recycling step. Carrying out these steps can adjust the particle size of a water-absorbing resin to be produced.

Further, any of various kinds of modifiers may be added during any step. In this case, example modifiers include a chelating agent, a reducing agent such as a sulfite, a urine resistance improver, an antiblocking agent such as water-insoluble fine particles, a surfactant, an anti-coloring agent, a deodorant agent, an antibacterial agent, and a dust suppressing agent. These modifiers are each used in an amount preferably of not more than 5 parts by weight, more preferably of 0.0001 parts by weight to 1 part by weight, further preferably of 0.001 parts by weight to 0.5 parts by weight, with respect to 100 parts by weight of the water-absorbing resin powder.

[3] Physical Properties of Polyacrylic Acid (Salt)-Based Water-Absorbing Resin

A production method in accordance with the present invention is suitably a method for producing water-absorbing resin that satisfies the physical properties (a) to (f) below. In particular, a production method in accordance with the present invention is, from the viewpoint of a smaller amount of fine powder generated and improved liquid permeability, without a decrease in the fluid retention capacity, preferably a method for producing water-absorbing resin that satisfies the physical properties (a), (d), and (f) below, more preferably a method for producing water-absorbing resin that satisfies the physical properties (b), (c), and (e) below in addition to the physical properties (a), (d), and (f).

(a) CRC (Centrifuge Retention Capacity) (ERT 441.1-02)

The present invention produces water-absorbing resin having a CRC (centrifuge retention capacity) preferably of not less than 10 g/g, more preferably of not less than 20 g/g, further preferably of not less than 25 g/g, particularly preferably of not less than 27 g/g.

The CRC may have any upper limit. The upper limit is preferably not more than 50 g/g, more preferably not more than 45 g/g, further preferably not more than 40 g/g, from the viewpoint of the balance between the CRC and other physical properties. The CRC may be controlled as appropriate with use of, for example, the above internal crosslinking agent and/or surface-crosslinking agent.

(b) AAP (Fluid Retention Capacity Under Pressure) (ERT 442.2-02)

The present invention produces water-absorbing resin having an AAP (fluid retention capacity under pressure) preferably of not less than 15 g/g, more preferably of not less than 20 g/g, further preferably of not less than 22 g/g, particularly preferably of not less than 24 g/g, under a load of 4.83 kPa (0.7 psi) from the viewpoint of prevention of leakage from a disposable diaper to be produced.

The AAP may have any upper limit. The upper limit is preferably not more than 40 g/g from the viewpoint of the balance between the AAP and other physical properties. The AAP may be controlled as appropriate, for example, with use of the above surface-crosslinking agent and/or by means of adjustment of the particle size.

(c) Ext (Water Soluble Component) (ERT 470.2-02)

The present invention produces water-absorbing resin having an Ext (water soluble component) preferably of not more than 30 weight %, more preferably of not more than 20 weight %, further preferably of not more than 15 weight %, particularly preferably of not more than 10 weight %.

The Ext may have any lower limit. The lower limit is preferably not less than 3 weight % from the viewpoint of the balance between the Ext and other physical properties, in particular the CRC. The Ext may be controlled as appropriate with use of, for example, the above internal crosslinking agent.

(d) PSD (Particle Size Distribution) (ERT 420.2-02)

The present invention produces water-absorbing resin having a weight average particle diameter (D50) preferably of 100 μm to 600 μm, more preferably of 200 μm to 500 μm, further preferably of 250 μm to 450 μm, particularly preferably of 300 μm to 400 μm.

A weight average particle diameter (D50) outside the above range leads to deterioration in liquid permeability, and may thus cause a considerable decrease in the water absorption speed (FSR, Vortex), with the result that the water-absorbing resin may, in a case where it is used in an absorbent body for a disposable diaper, cause liquid leakage, for example.

The present invention produces water-absorbing resin having a particle size distribution in which particles each with a particle diameter of not less than 150 μm and less than 710 μm have a proportion preferably of not less than 50 weight %, more preferably of not less than 80 weight %, and in which particles each with a particle diameter of less than 150 μm have a proportion preferably of not more than 5 weight %, more preferably of not more than 3 weight %, further preferably of not more than 1 weight %. Further, the present invention produces water-absorbing resin having a particle size distribution with a logarithm standard deviation (σζ) preferably of 0.20 to 0.50, more preferably of 0.30 to 0.40. A logarithm standard deviation outside the above range leads to deterioration in liquid permeability, and may thus cause a considerable decrease in the water absorption speed (FSR, Vortex).

The PSD is controlled at a finished-product stage. The PSD may alternatively be controlled to be within the above range through, for example, crushing before surface crosslinking, a classification operation, and/or fine powder recycling.

(e) Moisture Content (ERT 430.2-02)

The present invention produces water-absorbing resin having a moisture content preferably of 0.1 weight % to 15 weight %, more preferably of 0.5 weight % to 10 weight %, from the viewpoint of water absorption performance and impact resistance.

(f) SFC (Saline Flow Conductivity)

The present invention produces water-absorbing resin having an SFC (saline flow conductivity) preferably of not less than $10 \times 10^{-7} \cdot cm^3 \cdot s \cdot g^{-1}$, more preferably of not less than $50 \times 10^{-7} \cdot cm^3 \cdot s \cdot g^{-1}$, further preferably of not less than $70 \times 10^{-7} \cdot cm^3 \cdot s \cdot g^{-1}$, even more preferably of not less than $92 \times 10^{-7} \cdot cm^3 \cdot s \cdot g^{-1}$, particularly preferably of not less than $95 \times 10^{-7} \cdot cm^3 \cdot s \cdot g^{-1}$, most preferably of not less than $100 \times 10^{-7} \cdot cm^3 \cdot s \cdot g^{-1}$, from the viewpoint of prevention of leakage from a disposable diaper to be produced.

The SFC may have any upper limit. The upper limit is preferably not more than $3000 \times 10^{-7} \cdot cm^3 \cdot s \cdot g^{-1}$, more preferably not more than $2000 \times 10^{-7} \cdot cm^3 \cdot s \cdot g^{-1}$, further preferably not more than $1000 \times 10^{-7} \cdot cm^3 \cdot s \cdot g^{-1}$, particularly preferably not more than $500 \times 10^{-7} \cdot cm^3 \cdot s \cdot g^{-1}$, most preferably not more than $300 \times 10^{-7} \cdot cm^3 \cdot s \cdot g^{-1}$, from the viewpoint of the balance between the SFC and other physical properties.

[4] Purpose of Use of Polyacrylic Acid (Salt)-Based Water-Absorbing Resin

A production method in accordance with the present invention allows for production of water-absorbing resin that generates only a small amount of fine powder, that does not have an excessively decreased fluid retention capacity, and that has improved liquid permeability. The water-absorbing resin thus has various purposes of use and is, in particular, widely used in a hygiene product such as a disposable diaper. The water-absorbing resin is, in particular, preferably usable as an absorbent body for a high-concentration disposable diaper (one (1) high-concentration disposable diaper contains a large amount of water-absorbing resin) that problematically suffers from odor, coloring, and the like arising from a raw material.

The absorbent body may be an absorbent material such as pulp fiber other than water-absorbing resin. In this case, the absorbent body contains the water-absorbing resin in an amount (core concentration) preferably of 30 weight % to 100 weight %, more preferably of 40 weight % to 100 weight %, further preferably of 50 weight % to 100 weight %, even more preferably of 60 weight % to 100 weight %, particularly preferably of 70 weight % to 100 weight %, most preferably of 75 weight % to 95 weight %.

The core concentration is preferably within the above range because in such a case, the water-absorbing resin has excellent diffusion property with respect to, for example, a body fluid such as urine and blood and an efficient liquid distribution helps increase the absorption amount.

The present invention may take any of the following aspects:

1. A method for producing polyacrylic acid (salt)-based water-absorbing resin, including a step of polymerizing an acrylic acid (salt)-based aqueous monomer solution,
in which a polymerization reaction apparatus used in said polymerization reaction unit covered with a casing, and
in said polymerization step, a polymerization reaction is carried out under conditions that internal pressure of the polymerization reaction unit is reduced by a range of more than 0 kPa and not more than 10 kPa relative to ambient pressure at the periphery of the polymerization reaction unit.

2. The method according to the aspect 1, in which the internal pressure of the polymerization reaction unit is measured inside discharge piping connected to a discharge outlet installed at the polymerization reaction unit.

3. The method according to the aspect 2, in which a plurality of the discharge outlets is installed.

4. The method according to any one of the aspects 1 to 3, in which a gas is supplied from outside to inside of the polymerization reaction unit.

5. The method according to the aspect 4, in which said gas is air or a mixed gas containing air as a main component.

6. The method according to the aspects 4 or 5, in which a temperature of said gas is lower than 50° C.

7. The method according to any one of the aspects 4 to 6, in which a range of temperature change for said gas is 5° C. to 40° C. by the hour, by the day or by the season.

8. The method according to any one of the aspects 1 to 7, in which, in said polymerization step, a temperature of an aqueous monomer solution that is supplied to the polymerization reaction unit is 40° C. or more and lower than 100° C.

9. The method according to any one of the aspects 1 to 8, in said polymerization step, a water content of an aqueous monomer solution supplied to the polymerization reaction unit is 30 weight % to 70 weight %.

10. The method according to any one of the aspects 1 to 9, in which, in said polymerization step, a polymerization initiator contained in an aqueous monomer solution supplied to the polymerization reaction unit is a thermal decomposition initiator.

11. The method according to any one of the aspects 1 to 10, in which, in the polymerization step, time for polymerization is not longer than 60 minutes.

12. The method according to any one of the aspects 1 to 11, in which, in said polymerization step, a highest temperature point is not lower than 100° C.

13. The method according to any one of the aspects 1 to 12, in which, the polymerization reaction unit includes a continuous kneader polymerization device or a continuous belt polymerization device.

14. The method according to any one of the aspects 1 to 13, in which a rate of volatilization defined as a proportion of an entire weight of a hydrogel obtained through said polymerization step relative to an entire weight of an aqueous monomer solution supplied in the polymerization step is not less than 1 weight %.

15. The method according to any one of the aspects 1 to 14, in which a volatile component that is volatilized in the polymerization step is collected after discharged to outside the polymerization reaction unit.

16. The method according to the aspect 15, in which the volatile component is collected by cooling or by water outside the polymerization reaction apparatus.

17. The method according to the aspect 15 or 16, in which the collected volatile component is reused during the polymerization step.

18. A polymerization reaction apparatus for polyacrylic acid (salt)-based water-absorbing resin, including
a polymerization reaction unit, in which a discharge outlet is installed, and covered with a casing,
discharge piping connected to the discharge outlet, and
a manometer to measure a difference in pressure between internal pressure of the polymerization reaction unit and ambient pressure at the periphery of the polymerization reaction unit.

19. A method for collecting a volatile component discharged from a step of polymerizing an acrylic acid (salt)-based aqueous monomer solution, in which the volatile component discharged from the polymerization step is collected under conditions that internal pressure of a polymerization reaction unit, in which the polymerization step is carried out, is reduced by a range of more than 0 kPa and not more than 10 kPa relative to ambient pressure at the periphery of the polymerization reaction unit.

EXAMPLES

The following description will discuss the present invention more concretely in accordance with Examples and Comparative Examples below. Note, however, that the present invention is not limited to these, and that any Example derived from a proper combination of technical means disclosed in respective different Examples is also encompassed in the technical scope of the present invention.

Unless otherwise specified, the electric devices (including devices used to measure physical properties of water-absorbing resin) used in the Examples and Comparative Examples used a 200-V or 100-V power supply. Further, unless otherwise specified, the physical properties of water-absorbing resin of the present invention were measured at room temperature (20° C. to 25° C.) and at a relative humidity of 50% RH±10%.

The description below may use the expression "l" or "L" to mean "liter" and the expression "wt %" to mean "weight %" for convenience. Further, the description below uses the expression "N.D. (non detected)" to mean a value below the detection limit in measurement of trace components.

[Measurement of Physical Properties of Water-Absorbing Resin]

(a) CRC (Centrifuge Retention Capacity)

The CRC (centrifuge retention capacity) of water-absorbing resin of the present invention was measured in conformity with the EDANA method (ERT 441.2-02).

(b) AAP (Fluid Retention Capacity Under Pressure)

The AAP (fluid retention capacity under pressure) of water-absorbing resin of the present invention was measured in conformity with the EDANA method (ERT 442.2-02), with the load changed to 4.83 kPa (0.7 psi).

(c) Ext (Water Soluble Component)

The Ext (water soluble component) of water-absorbing resin of the present invention was measured in conformity with the EDANA method (ERT 470.2-02).

(d) PSD (Particle Size Distribution) and Weight Average Particle Diameter (D50), and Logarithm Standard Deviation (σζ) of Particle Size Distribution The PSD (particle size distribution) and weight average particle diameter (D50), and the logarithm standard deviation (σζ) of the particle size distribution of water-absorbing resin of the present invention were measured in conformity with "(3) Mass-Average Particle Diameter (D50) and Logarithmic Standard Deviation (σζ) of Particle Diameter Distribution" disclosed in columns 27 and 28 of U.S. Pat. No. 7,638,570.

The weight average particle diameter (D50) and logarithm standard deviation (σζ) of the particle size distribution of a particulate hydrogel were measured in conformity with a measurement method disclosed in International Publication No. 2011/126079.

(e) Moisture Content and Resin Solid Content

The moisture content of water-absorbing resin of the present invention was measured in conformity with the EDANA method (ERT 430.2-02), with the drying temperature changed to 180° C. for the present invention. Five measurements were made of each sample, and the mean value was used. The resin solid content of water-absorbing resin of the present invention was defined as {100−(moisture content)}(weight %).

(g) Liquid Permeability (SFC: Saline Flow Conductivity)

The SFC (saline flow conductivity) of water-absorbing resin of the present invention was measured in conformity with a measurement method disclosed in U.S. Pat. No. 5,669,894.

Example 1

A polymerization reaction apparatus was prepared that included an adjustment tank having a capacity of 1 m³, a polymerization reaction unit, and other incidental equipment.

The preparation tank was charged with acrylic acid at 26.1 kg/hr, 48.5 weight % aqueous sodium hydroxide solution at 21.0 kg/hr, 30 weight % aqueous polyethyleneglycol diacrylate (with an average molecular weight of 487) solution at 0.103 kg/hr as an internal crosslinking agent, ion-exchange water at 12.0 kg/hr, and a solution (1) at 0.321 kg/hr that contained 0.989 parts by weight of 2-hydroxymethyl-2-methylpropiophenone and 1.08 parts by weight of 45 weight % aqueous diethylene triamine pentaacetate pentasodium solution both dissolved in 97.4 parts by weight of 20 weight % aqueous acrylic acid solution. These ingredients were mixed with one another to prepare a liquid mixture (1). The liquid mixture (1) in the preparation tank at this stage had a temperature of approximately 95° C.

Next, the liquid mixture (1) was taken out from the preparation tank at a flow rate of 59.5 kg/hr, and was then fed into the continuous belt polymerization device with use of a solution sending pump while the liquid temperature was kept at 95° C. During this operation, the liquid mixture (1) was stirred with use of a static mixer installed in the feeding piping, and 2 weight % aqueous sodium persulfate solution was then added as a polymerization initiator at a flow rate of 0.544 kg/hr. The liquid mixture (1) to which the polymerization initiator had been added was termed "aqueous monomer solution (1)". The aqueous monomer solution (1) had a rate of neutralization of 70 mol % and a water content of 47 weight %.

Example 1 used, as the polymerization reaction unit, a continuous belt polymerization device covered with a casing. This continuous belt polymerization device was provided with an endless belt having a length of 3.8 m and a width of 60 cm and having a surface coated with fluorine resin, piping (feeding piping) for feeding the aqueous monomer solution, a discharge port for a hydrogel produced, air introducing inlet (gas inlet) for introducing air from the atmosphere at the periphery of (outside) the polymerization device, a discharge outlet for discharging gas from the polymerization reaction unit to the outside of the system, a UV lamp for ultraviolet irradiation as well as instrumentation devices such as a thermometer and a manometer and piping for feeding raw materials. The belt and its peripheral portion (liquid contact portion), and the like were heated to and kept at approximately 100° C. Further, air introduced through the air introducing inlet had a temperature of 12° C. to 25° C. (with a change width of 13° C.) during the experiment period described later.

The aqueous monomer solution (1) started polymerization immediately after being fed into the continuous belt polymerization device, and swelled while emitting water vapor. The aqueous monomer solution (1) ended swelling approximately 1 minute later, and then shrunk. The polymerization had a polymerization starting temperature of 95° C. and a maximum reaching temperature of 108° C. The polymerization produced a belt-shaped hydrogel (1). The rate of volatilization was 25% as calculated from the weight of the hydrogel (1) produced and the weight of the aqueous monomer solution (1) fed.

During the polymerization step, an aspirator (exhaust device) disposed outside the system was used to discharge gas from the polymerization reaction unit through the discharge outlet. The polymerization reaction unit then had internal pressure (gage pressure) of −3 kPa (pressure reduction level: 3 kPa). The pressure inside the polymerization reaction unit was measured at a position inside discharge piping tube connected to the discharge outlet which position was 1 m away from the polymerization reaction unit (polymerization device).

The gas discharged to the outside of the system of the polymerization reaction unit through the discharge piping was introduced into cooling piping containing a 5° C. refrigerant for condensation, and was then collected as an acrylic acid aqueous solution. The acrylic acid aqueous solution was analyzed with use of the liquid chromatography analysis device used for measurement of residual monomer. The concentration of the acrylic acid was thus found to be 3 weight %.

Next, the belt-shaped hydrogel (1) having a surface temperature of 70° C. was fed continuously into a gel-crusher for gel-crushing. This operation produced hydrogel (1) in the form of particles each having a diameter of approximately 2 mm.

Subsequently, the particulate hydrogel (1) was placed on a porous plate of a ventilation band-type continuous dryer to have a thickness of 50 mm, and was then dried by letting through 180° C. hot air at a velocity of 1.6 (m/s) for 30 minutes. This operation produced a block-shaped dry polymer (1).

Subsequently, the block-shaped dry polymer (1) was wholly fed continuously into a three-stage roll mill (with roll gaps of 1.0 mm, 0.65 mm, and 0.42 mm from above) for crush. This operation produced a crushed polymer (1).

Subsequently, the crushed polymer (1) was wholly fed continuously into a classification device (that is, a sieving device including two metal sieves having respective mesh sizes of 600 μm and 300 μm from above) for classification. This operation produced water-absorbing resin powder (1).

The above operations were performed continuously for 24 hours while water-absorbing resin powder (1) was sampled every hour. The CRC, water soluble component, and residual monomer of each of the 25 samples of water-absorbing resin powder (1) were measured. Table 1 shows the results.

Comparative Example 1

Operations similar to those of Example 1 were performed except that the pressure inside the polymerization reaction unit (gage pressure) was changed to −20 kPa (pressure reduction level: 20 kPa). This produced comparative water-absorbing resin powder (1). Table 1 shows the results.

Comparative Example 2

Operations similar to those of Example 1 were performed except that the pressure inside the polymerization reaction unit (gage pressure) was changed to 0 kPa (pressure reduction level: 0 kPa). This produced comparative water-absorbing resin powder (2). Table 1 shows the results.

Example 2

Operations similar to those of Example 1 were performed except that ion-exchange water and acrylic acid for use in the preparation of an aqueous monomer solution were partly replaced with the acrylic acid aqueous solution collected in Example 1. This produced water-absorbing resin powder (2).

The replacement was performed under the following conditions: 12.0 kg/hr of ion-exchange water was replaced with 12.4 kg/hr of 3 weight % of aqueous acrylic acid solution, and 26.1 kg/hr of acrylic acid was changed to 25.7 kg/hr.

Example 2 was not different from Example 1 in terms of, for example, the polymerization state, the rate of volatilization, the rate of recovery of an acrylic acid aqueous solution, and the physical properties of water-absorbing resin powder (2) produced.

INDUSTRIAL APPLICABILITY

A method of the present invention allows for stable physical properties for water-absorbing resin to be produced, and thus decreases the number of products that fail to meet the specs and allows for stable continuous production. A method of the present invention also increases the rate of recovery of monomer components volatilizing during polymerization, and thus helps decrease the influence on the environment (that is, reduction of waste) and reduce production costs. The present invention, which has the above advantages, is widely applicable as a method for producing water-absorbing resin (in particular, a polymerization method).

The invention claimed is:

1. A method for producing polyacrylic acid (salt)-based water-absorbing resin comprising a step of polymerizing an acrylic acid (salt)-based aqueous monomer solution,

TABLE 1

| | Pressure reduction level [kPa] | CRC (n = 25) | | Water soluble component (n = 25) | | Residual monomer (n = 25) | | Rate of recovery of acrylic acid aqueous solution [%] |
|---|---|---|---|---|---|---|---|---|
| | | Average [g/g] | Standard deviation [—] | Average [wt %] | Standard deviation [—] | Average [ppm] | Standard deviation [—] | |
| Example 1 | 3 | 34 | 0.6 | 12 | 0.8 | 770 | 10 | 96 |
| Comparative Example 1 | 20 | 34 | 1.1 | 13 | 1.2 | 774 | 30 | 88 |
| Comparative Example 2 | 0 | 34 | 0.8 | 12 | 1.0 | 780 | 30 | 83 |

(Conclusion)

A comparison between Example 1 (pressure reduction level: 3 kPa), Comparative Example 1 (pressure reduction level: 20 kPa), and Comparative Example 2 (pressure reduction level: 0 kPa) shows that controlling the pressure reduction level during polymerization so that the pressure reduction level was within a particular range (that is, more than 0 kPa and not more than 10 kPa) allowed for stable physical properties (namely, the CRC, water soluble component, and residual monomer) for water-absorbing resin powder to be produced and also increased the rate of recovery of a monomer (acrylic acid aqueous solution) having volatilized during the polymerization.

wherein a polymerization reaction apparatus used in said polymerization step has a polymerization reaction unit covered with a casing, and wherein, in said polymerization step, a polymerization reaction is carried out under conditions that internal pressure of said polymerization reaction unit is reduced by a range of more than 0 kPa and not more than 10 kPa relative to ambient pressure at the periphery of said polymerization reaction unit.

2. The method according to claim 1, wherein the internal pressure of said polymerization reaction unit is measured inside discharge piping connected to a discharge outlet installed at said polymerization reaction unit.

3. The method according to claim 2, wherein a plurality of said discharge outlets are installed.

4. The method according to claim 1, wherein a gas is supplied from outside to inside of said polymerization reaction unit.

5. The method according to claim 4, wherein said gas is air or a mixed gas containing air as a main component.

6. The method according to claim 4, wherein a temperature of said gas is lower than 50° C.

7. The method according to claim 4, wherein a range of temperature change for said gas is 5° C. to 40° C. by the hour, by the day or by the season.

8. The method according to claim 1, wherein, in said polymerization step, a temperature of an aqueous monomer solution that is supplied to said polymerization reaction unit is not lower than 40° C. and lower than 100° C.

9. The method according to claim 1, wherein, in said polymerization step, a water content of an aqueous monomer solution that is supplied to said polymerization reaction unit is 30 weight % to 70 weight %.

10. The method according to claim 1, wherein, in said polymerization step, a polymerization initiator contained in an aqueous monomer solution that is supplied to said polymerization reaction unit is a thermal decomposition initiator.

11. The method according to claim 1, wherein, in said polymerization step, time for polymerization is not longer than 60 minutes.

12. The method according to claim 1, wherein, in said polymerization step, a highest temperature point is not lower than 100° C.

13. The method according to claim 1, wherein said polymerization reaction unit includes a continuous kneader polymerization device or a continuous belt polymerization device.

14. The method according to claim 1, wherein a rate of volatilization defined as a proportion of an entire weight of a hydrogel obtained through said polymerization step relative to an entire weight of an aqueous monomer solution that is supplied in said polymerization step is not less than 1 weight %.

15. The method according to claim 1, wherein a volatile component that is volatilized in said polymerization step is collected after discharged to outside said polymerization reaction unit.

16. The method according to claim 15, wherein said volatile component is collected by cooling or by water outside said polymerization reaction apparatus.

17. The method according to claim 15, wherein said collected volatile component is reused during said polymerization step.

* * * * *